US005651456A

United States Patent [19]
Gunning

[11] Patent Number: 5,651,456
[45] Date of Patent: Jul. 29, 1997

[54] MULTI-MEDIA STORAGE SYSTEM

[76] Inventor: John D. Gunning, 55 Pharr Rd. Apt. D204, Atlanta, Ga. 30305

[21] Appl. No.: 349,895

[22] Filed: Dec. 6, 1994

[51] Int. Cl.⁶ .................................................. B65D 85/57
[52] U.S. Cl. .......................... 206/307.1; 206/308.1; 206/308.3; 206/509; 312/9.47; 312/111
[58] Field of Search ................. 206/307.1, 308.3, 206/387.12, 511, 503, 509; 220/4.27, 23.83; 312/107, 108, 111, 9.47

[56] References Cited

U.S. PATENT DOCUMENTS

| | | | |
|---|---|---|---|
| D. 277,816 | 3/1985 | Kleinert et al. | D6/446 |
| D. 287,554 | 1/1987 | Radtke | D6/446 |
| D. 291,633 | 9/1987 | Merzon | D6/446 |
| D. 321,999 | 12/1991 | Hasuike | D6/446 |
| 394,377 | 12/1888 | Kieter | 312/317 |
| 2,200,319 | 5/1940 | Zalkind | 45/77 |
| 2,667,392 | 1/1954 | Sexton | 311/103 |
| 3,003,839 | 10/1961 | Bloom et al. | 312/111 |
| 3,203,744 | 8/1965 | Batke | 312/111 |
| 3,446,544 | 5/1969 | Serwer | 312/111 |
| 3,751,127 | 8/1973 | Black et al. | 312/111 |
| 3,909,078 | 9/1975 | Riley | 308/3.6 |
| 4,501,456 | 2/1985 | Schafer | 312/273 |
| 4,512,480 | 4/1985 | Evenson | 211/11 |
| 4,544,213 | 10/1985 | Long et al. | 312/183 |
| 4,624,509 | 11/1986 | Ramsey | 312/234.5 |
| 4,634,193 | 1/1987 | Liu | 312/107 |
| 4,745,775 | 5/1988 | Bussan et al. | 62/382 |
| 4,856,855 | 8/1989 | Hasuike | 312/111 |

FOREIGN PATENT DOCUMENTS

| | | | |
|---|---|---|---|
| 1381424 | 11/1964 | France | 312/111 |
| 318158 | 2/1957 | Switzerland | 312/111 |

OTHER PUBLICATIONS

Global ©1987 p. 44; Storage Cabinet #104830 Top Left Center on Page (Des. LIB. Box C–44).

Pp.9–17, 21 & 23 from Perma Products Magazine 1993.

Pp. 15–20 from Misco Magazine – 1994 Fall Computer Products Catalog.

*Primary Examiner*—Jimmy G. Foster
*Attorney, Agent, or Firm*—Isaf, Vaughan & Kerr; Louis T. Isaf

[57] ABSTRACT

A multi-media storage container assembled from electrically nonconducting materials and including an elongated rectilinear outer sleeve, or case, that defines a cavity in which a partitionable insert, or drawer, resides to receive and securely store different types and sizes of computer data media in a dust-free, static-free environment. A plurality of columnar supports are located within the cavity and adjacent side panels to enhance the structural rigidity of the outer sleeve. The columnar supports extend through the outer sleeve to enable interconnection of the columnar supports of a first outer sleeve to those of, at least, a second outer sleeve, thereby enabling the creation of virtually, continuous column supports to enhance the stackability of storage containers. A base plate rests in the bottom of the cavity adjacent to a bottom panel of the outer sleeve and releasably latches to each columnar support to structurally unite the columnar supports and provide increased structural strength. The multi-media storage container further includes a face plate coupled to the insert to function as a front for the outer sleeve, while providing a user with a means for inserting or removing the insert from the cavity.

46 Claims, 26 Drawing Sheets

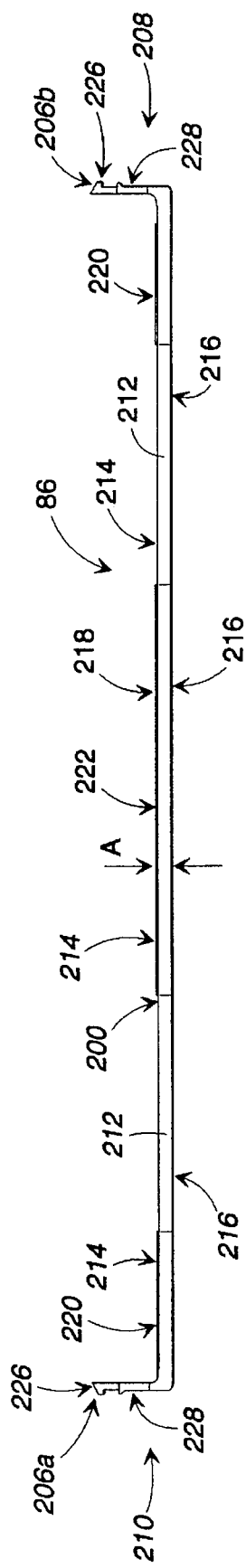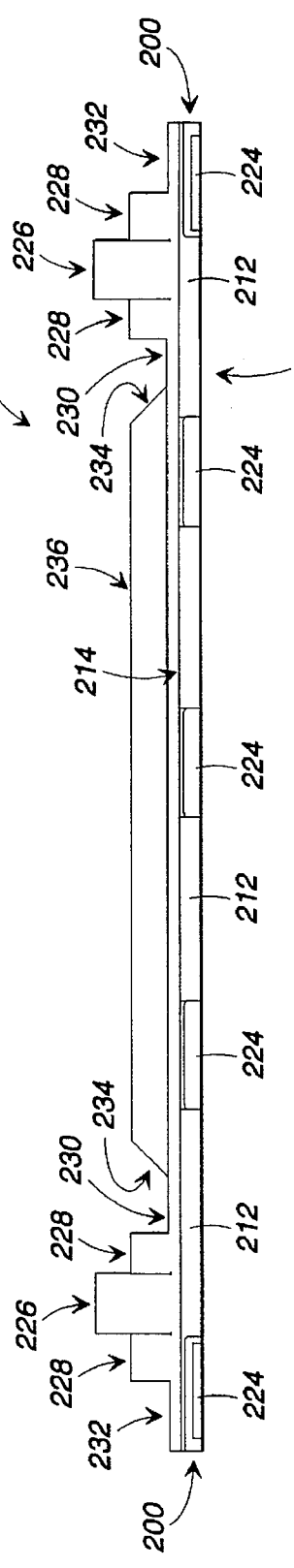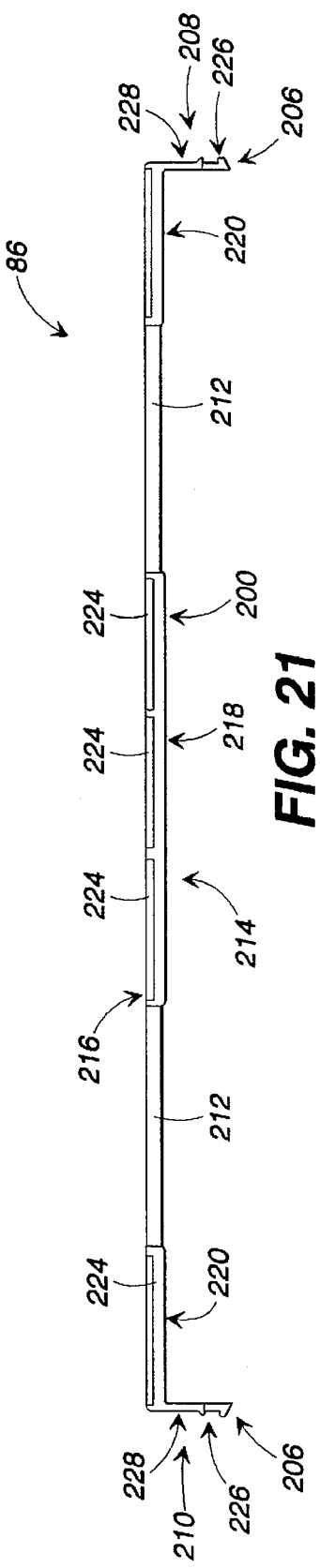

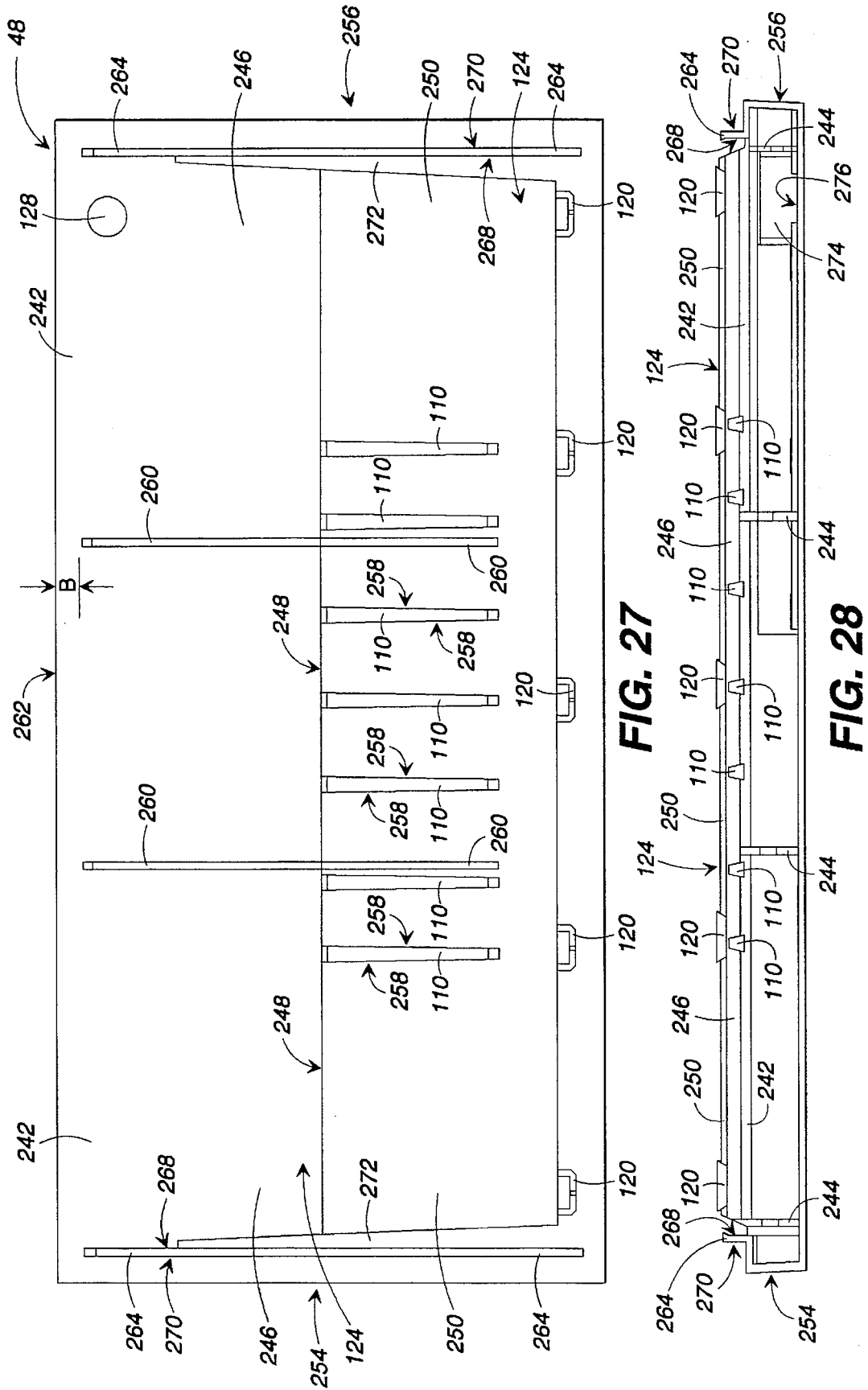

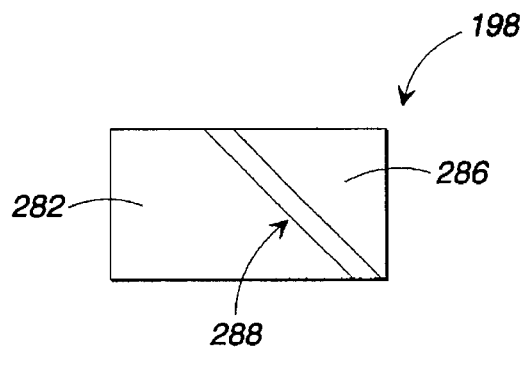
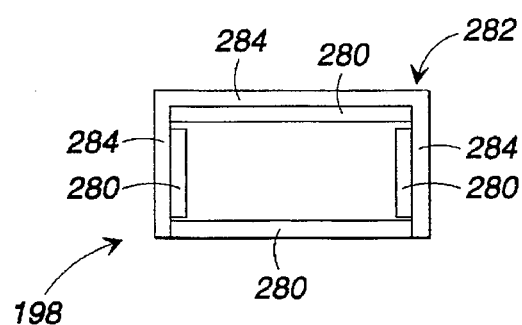
FIG. 30                FIG. 31
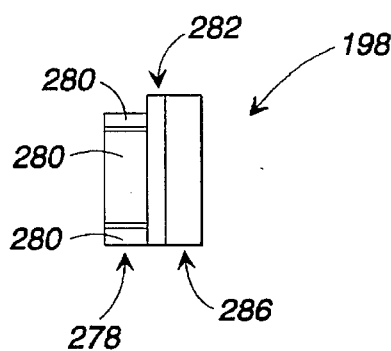
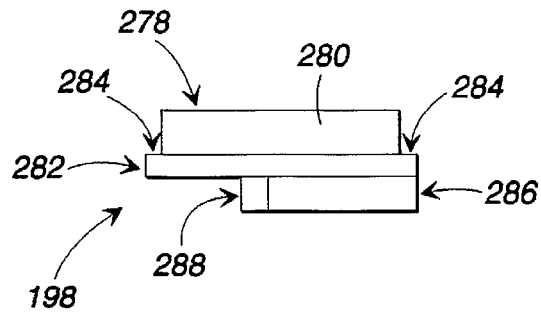
FIG. 32                FIG. 33

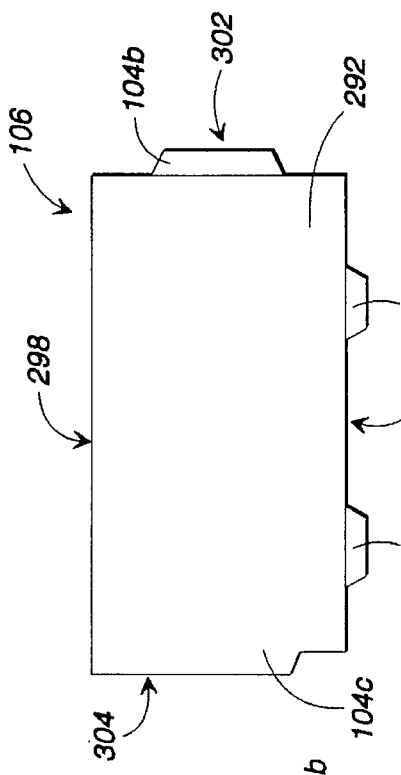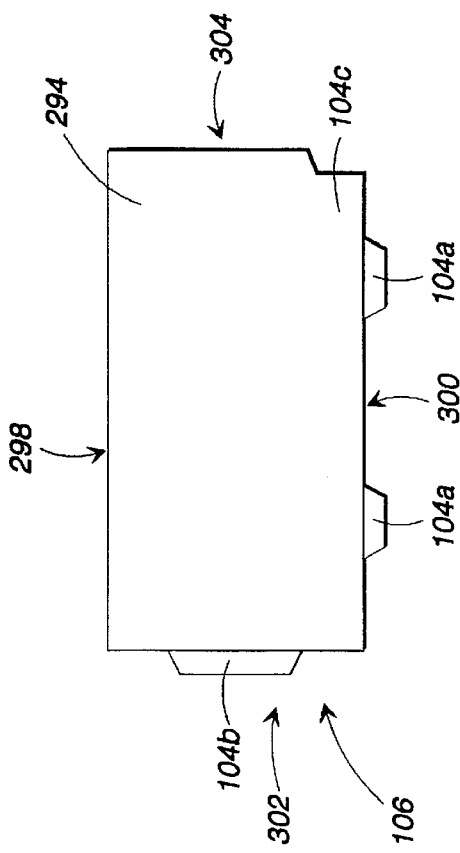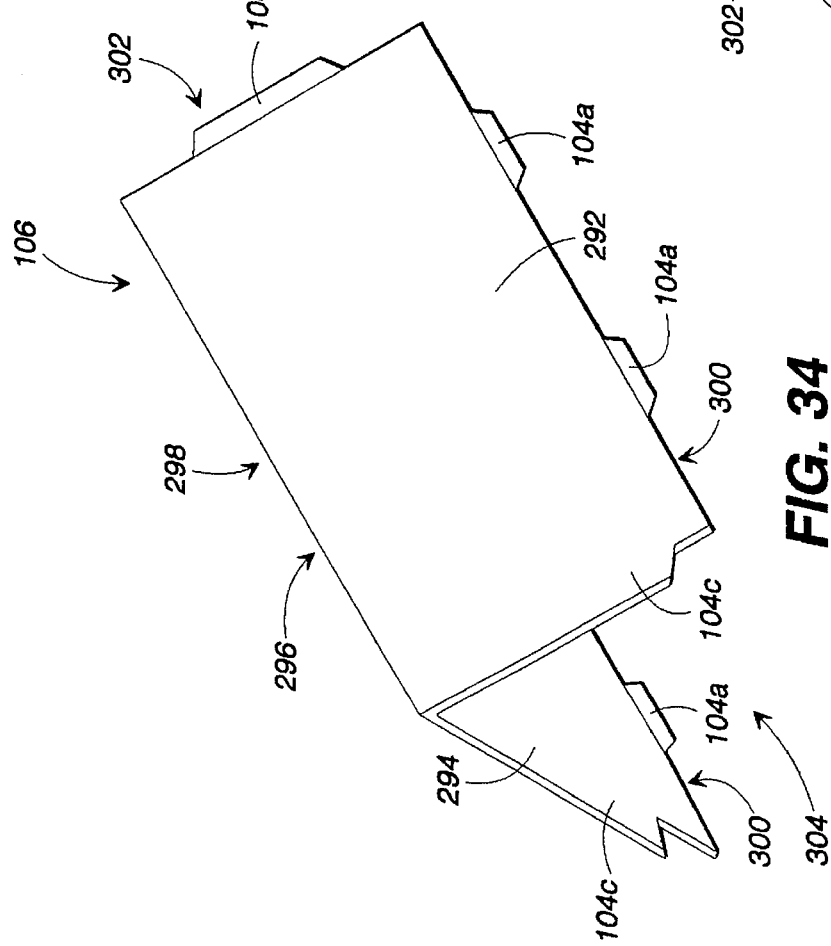

MULTI-MEDIA STORAGE SYSTEM

BACKGROUND OF THE INVENTION

The present invention relates generally to the field of stackable, storage containers and, in its most preferred embodiments, to the field of apparatus and methods for storing computer data media (or other articles) in stackable containers that reduce exposure of the media to dust and static electricity.

In the not to distant past, eight-inch floppy disks and large magnetic tape reels were the primary media for storage of computer data for a limited base of installed electronic computer equipment. Today, those media are no longer the primary media of choice for data storage. Instead, media based upon the same basic magnetic technologies have been enhanced to hold more data in a smaller form factor. Thus, the eight-inch floppy disk has been replaced by five and a quarter-inch floppy disks and three and a half-inch floppy disks, while the large magnetic tape reel has been replaced by smaller tape cartridges including 3480 cartridges, 8 mm back-up tape cartridges, and streamer tape cartridges. In addition, a number of new technologies have spawned a variety of media types in various form factors such as CD-ROMS, writable CD's, laser optical disks, floptical disks, removable hard disks, heli-scan tape cartridges, and others.

With the advent of smaller computers and the proliferation of new media, the electronic media suppliers have created consumer demand for media organization and storage that is expandable, allows for mixed media organization, easy access, some level of security and a system that provides for static electricity-free archival storage of original program media, as well as dated information that has been purged from their systems, but must be retained for future potential reference. Few existing media storage systems meet these requirements. Of the systems that meet the above requirements, most are available in plastic only and must be shipped from the manufacturer in a fully-assembled state. By the nature of their design, they create a considerable cube size and, as a result, consume a considerable amount of space during shipping, warehousing, and when displayed on store shelves.

There is, therefore, a need in the industry for a stackable apparatus that provides adaptable storage for different types and sizes of computer data media, while requiring less space than existing apparatus during warehousing, shipping, and store display. The present invention meets these needs and solves other related and unrelated problems.

SUMMARY OF THE INVENTION

Briefly described, the present invention includes a self-supporting, user-assembled, stackable multi-media storage container that enables the dust-free, static-free storage of different types and sizes of computer data media (or, for that matter, any other articles such as documents, photographs, etc.). More particularly, the multi-media storage container includes an outer sleeve that interfaces with internal structural components to enhance the stackability of the containers. The multi-media storage container further includes a uniquely designed, removable insert that resides within the outer sleeve to hold media in a variably-partitionable, media reservoir. Additionally, the multi-media storage container includes a face plate, comprising a front for the container, that couples to the insert to provide, among other things, a means for sliding the insert into or out of the storage container.

In accordance with the preferred embodiment of the present invention, the multi-media storage container includes an outer sleeve, or case, assembled, preferably, from corrugated cardboard panels die cut and folded from a cleverly arranged pattern to produce an outer sleeve having interior and exterior panels adjacent to one another (i.e., in effect, creating an outer sleeve with two-ply walls). The resulting outer sleeve defines a cavity (open at the front of the outer sleeve) in which columnar supports are placed adjacent to the side panels of the outer sleeve to greatly enhance its vertical crush resistance. A web portion of each columnar support is located within the cavity, while mating portions at the ends of each columnar support interact with opposing support interaction portions of the outer sleeve that include specially designed aperatures which are die cut and strategically positioned along the edges formed where the side panels abut the top and bottom panels of the outer sleeve. The specially designed aperatures include interior aperatures that extend only through the interior panels and exterior aperatures that extend through the interior, as well as the exterior panels. The exterior aperatures are made smaller than the interior aperatures to enable a smaller exterior face of a columnar support mating portion to extend through both panels and lie flush with the exterior surfaces of the exterior panels of the outer sleeve. Because each exterior face includes an interconnection clip receptacle, multiple storage containers may be stacked (or arranged in an array of storage containers) and linked together by inserting clips into the appropriate interconnection clip receptacles, thereby creating a stack of storage containers with continuous, virtual, internal columnar supports that extend the entire height of the stack to enhance structural rigidity. Also, while the smaller exterior face of each columnar support mating portion extends through both aperatures, a larger interior face is trapped against the interior surfaces of the exterior panels to transfer vertical structural loads from the top panels to the columnar supports while maintaining the columnar support in position.

To tie the columnar supports into a single structural entity and thereby, enhance overall rigidity, the outer sleeve also includes, in accordance with the preferred embodiment of the present invention, a base plate that, after installation during assembly, resides adjacent to the bottom panels and within the cavity formed by the remaining panels of the outer sleeve. The base plate includes vertical uprights extending along its sides having hooks and paws to effect interconnection of the base plate with each columnar support. The base plate further includes a top surface that is grooved to limit side to side movement of the insert as it is inserted or withdrawn from the cavity. In addition, the thickness of the base plate is, preferably, made greatest at the midpoint between its sides to provide added support for the insert which may, otherwise, tend to bow near its midsection if overloaded with computer data media.

The multi-media storage container further includes an inventively designed face plate and insert that are coupled together to enable the insertion or removal of the insert from the outer sleeve. In accordance with the preferred embodiment of the present invention, the insert, like the outer sleeve, is assembled from corrugated cardboard panels die cut and folded from a cleverly arranged pattern to produce an insert having interior and exterior panels adjacent to one another (i.e., for the most part, creating an insert with two-ply walls). The insert defines a media reservoir that is made partitionable into different sized portions, using media dividers, to enable the insert to hold different types and sizes of media at the same time. The insert also enables use of media supports to prevent media from falling toward the rear of the insert.

The inventive design of the face plate and insert allow the face plate and insert to couple to one another. In accordance with the preferred embodiment of the present invention, the face plate has a plurality of internal ribs and an interfacing portion that work in conjunction with a front wall to define an internal chamber in which the front panel of the insert resides. The interfacing portion includes an upper portion that engages the front panel of the insert, pressing the front panel against the internal ribs, thereby coupling the face plate to the insert. To maintain their coupling, the face plate further includes a plurality of alignment fingers that extend from a lower portion of the interfacing portion to removably reside within a plurality of notches formed in a bottom panel of the insert.

Accordingly, it is an object of the present invention to store different types and sizes of computer data media.

Another object of the present invention is to prevent dust or static electricity from damaging or rendering unusable data retained by stored computer data media.

Still another object of the present invention is to store computer data media in stackable and interconnectable storage containers.

Still another object of the present invention is to inexpensively store computer data media.

Still another object of the present invention is to enhance the structural rigidity of an inexpensive multi-media storage container.

Still another object of the present invention is to enable stacking of storage containers by a consumer without requiring the consumer to additionally purchase a separate metal rack or other means to support the storage containers in the stacked configuration.

Still another object of the present invention is to reduce the volume of space required to ship, warehouse, and display multi-media storage containers.

Still another object of the present invention is to securely store computer data media.

Other objects, features, and advantages of the present invention will become apparent upon reading and understanding the present specification when taken in conjunction with the appended drawings.

BRIEF DESCRIPTION OF THE DRAWINGS

FIG. 19 is a front, elevational view of the base plate of FIG. 18.

FIG. 20 is a sectional view of the base plate of FIG. 18 taken along line 20—20 of FIG. 18.

FIG. 21 is a sectional view of the base plate of FIG. 18 taken along line 21—21 of FIG. 18.

FIG. 27 is a back, elevational view of the face plate of FIG. 25.

FIG. 28 is a bottom view of the face plate of FIG. 25.

FIG. 30 is a front, elevational view of an insert stop in accordance with the preferred embodiment of the present invention.

FIG. 31 is a back, elevational view of the insert stop of FIG. 30.

FIG. 32 is a right side, elevational view of the insert stop of FIG. 30.

FIG. 33 is a top view of the insert stop of FIG. 30.

FIG. 34 is a side, perspective view of a media divider in accordance with the preferred embodiment of the present invention.

FIG. 35 is a right side, elevational view of the media divider of FIG. 34.

FIG. 36 is a left side, elevational view of the media divider of FIG. 34.

DETAILED DESCRIPTION OF THE PREFERRED EMBODIMENT

Figure 1:
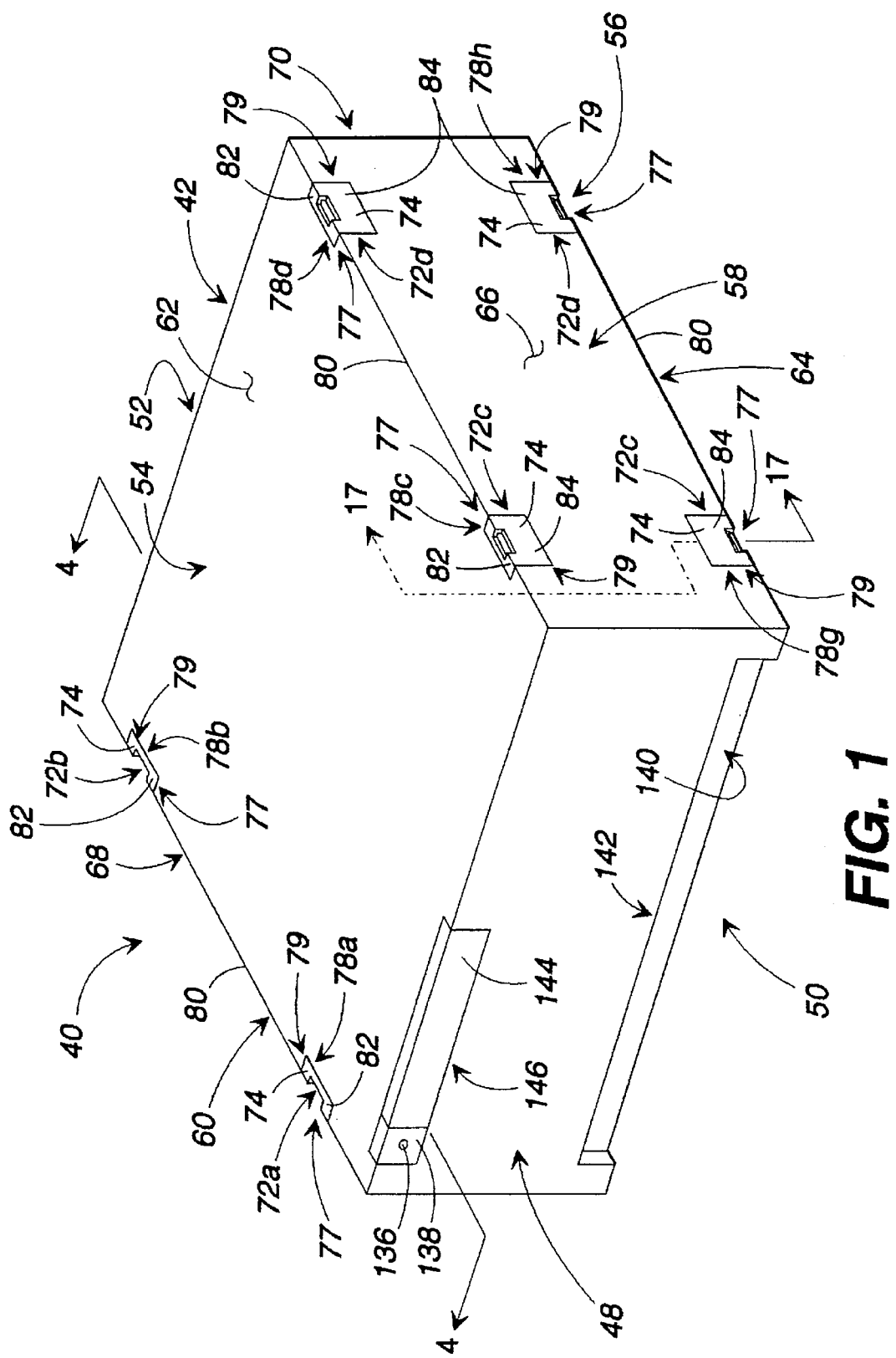
FIG. 1 is a side, perspective view of a multi-media storage container in accordance with the preferred embodiment of the present invention.

Referring now in greater detail to the drawings, in which like numerals represent like components throughout the several views, the side perspective view of FIG. 1 displays a multi-media storage container 40 of the present invention in a fully-assembled and fully-closed state. In accordance with the preferred embodiment of the present invention, the multi-media storage container 40 includes an outer sleeve 42 (or case) that defines a cavity 44 (see FIG. 2) for receipt of an insert 46 (or drawer) (see FIG. 3) and a face plate 48 that, when secured to the insert 46, acts as a front 50 for the container 40. The multi-media storage container 40 has, generally, an elongated rectilinear shape with a front 50, back 52, top 54, bottom 56, right side 58, and left side 60. The outer sleeve 42 is manufactured, preferably, from two-plys of corrugated cardboard with a top panel 62, bottom panel 64 (see FIG. 42), right side panel 66, left side panel 68, and back panel 70 (see FIG. 45) forming the top 54, bottom 56, right side 58, left side 60, and back 52, respectively, of the outer sleeve 42. The cavity 44 formed by the panels 62,64,66,68,70, working in conjunction with the face plate 48, create a dust-free environment for the storage and protection of media when the insert 46, containing media, is fully-inserted into the cavity 44.

Figure 2:
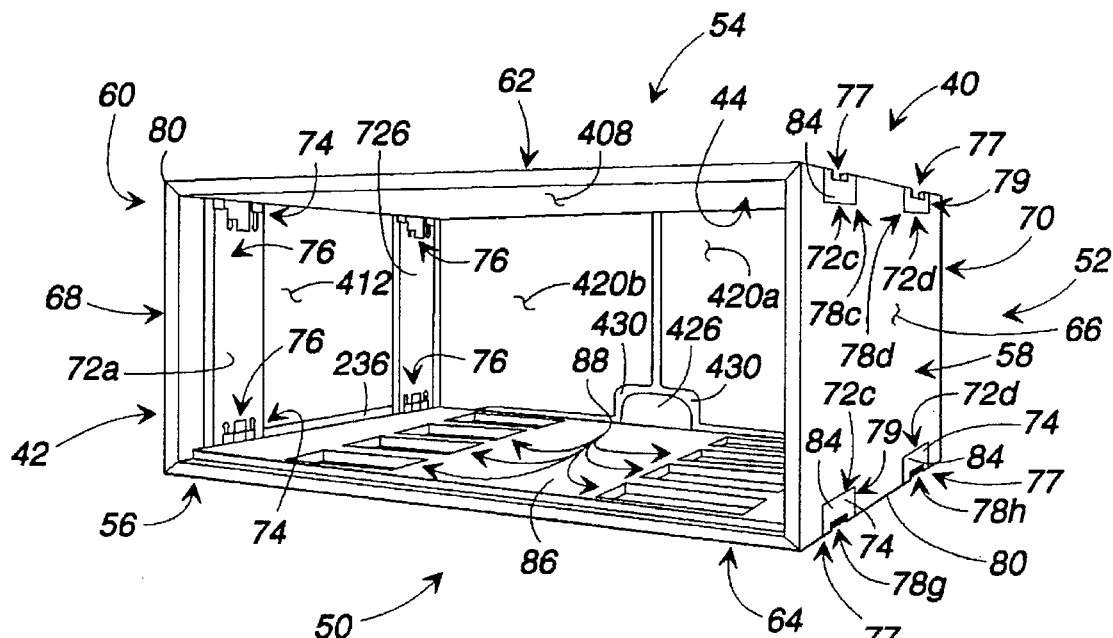
FIG. 2 is a front, perspective view of the outer sleeve of the multi-media storage container of FIG. 1.

The outer sleeve 42 includes a plurality of columnar supports 72 that enhance the structural rigidity of the outer sleeve's corrugated construction. As seen in the front perspective view of FIG. 2, a pair of the columnar supports 72a,b resides within the cavity 44 and adjacent the left side panel 68. A duplicate pair of columnar supports 72c,d resides within the cavity 44 and adjacent the right side panel 66 although, for the most part, not visible in FIG. 2. The columnar supports 72 extend the entire height of the right and left side panels 66,68 and have mating portions 74 at each end 76 that interact with a support interaction portion 77 in the outer sleeve 42. Each suppor interaction portion 77 includes a rim 79 that defines an aperature 78 for receiving a mating portion 74 of a columnar support 72. As shown by the aperatures 78 visible in FIGS. 1 and 2, each aperature 78 is located along an edge 80 defined by the top and bottom panels 62,64 abutting the right and left side panels 66,68. The aperatures 78 are, preferably, oriented so that a smaller portion 82 of each aperature 78 is defined by the top or bottom panels 62,64, while a larger portion 84 is defined by the right or left side panels, 66,68. The aperatures 78 are also, preferably, oriented as shown in FIGS. 1 and 2 with aperatures 78a,c,g positioned nearest the front 50 and 78b,d,h nearest the back 52, of the multi-media storage container 40.

At the bottom 56 of the cavity 44 (see FIG. 2), a base plate 86 rests atop the bottom panel 64 and extends from the front 56 to the back 52 of the cavity 44 and from the right side 58 to the left side 60 of the cavity 44 as well. Like the columnar supports 72, the base plate 86 is, preferably, manufactured from injection molded plastic. The base plate 86 detachably hooks to each of the columnar supports 72 to tie the base plate 86 and the columnar supports 72 together in a unified structure. The base plate 86 also, preferably, defines a plurality of cut-outs 88 that are strategically sized and located to reduce the quantity and, hence, the cost of material required for manufacture without substantially diminishing structural rigidity. Details of the columnar supports 72 and base plate 86 are discussed more thoroughly below.

Figure 3:
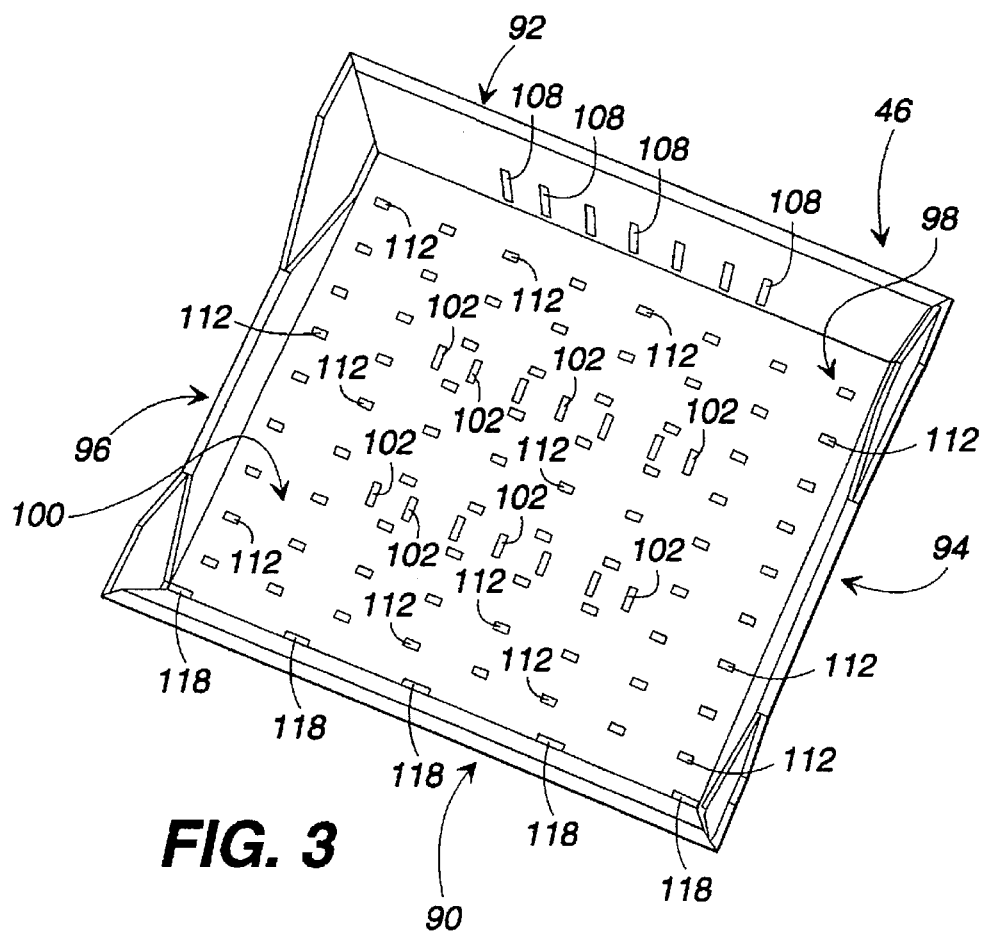
FIG. 3 is a top, perspective view of the insert of the multi-media storage container of FIG. 1.

When the multi-media storage container 40 is in use, the insert 46 resides within the cavity 44 and can hold a variety of different types of media. FIG. 3 displays a top perspective view of the insert 46 in accordance with the preferred embodiment of the present invention. The insert 46 is manufactured, preferably, from corrugated cardboard and, for the most part, utilizes two-ply construction. The insert 46, like the outer sleeve 42, has a generally, elongated rectilinear shape with a front panel 90, back panel 92, right side panel 94, left side panel 96, and bottom panel 98 that form a reservoir 100 in which media may reside. The bottom panel 98 also defines a first grid of slots 102 in which tabs 104a of a media divider 106 (see FIGS. 34–36) reside, when used, to separate the reservoir 100 into smaller, different sized volumes for holding different sized media. Corresponding slots 108,110 located in the back panel 92 and the face plate 48 (see FIGS. 3 and 27), respectively, receive tabs 104b,c of each media divider 106 to align the media divider 106 between the back panel 92 and the face plate 48 and parallel the side panels 94,96 of the insert 46. The bottom panel 98 further defines a second grid of slots 112 in which tabs 114 of a media support 116 (see FIGS. 37–39) reside, when used behind media, to prop-up and prevent media from falling toward the back panel 92 of the insert 46. Additionally, the bottom panel 98 defines a plurality of notches 118 near the front panel 90. Each notch 118 receives an alignment finger 120 of the face plate 48 (see FIG. 27) when the face plate 48 is positioned, in its operative location, about the front panel 90 of the insert 44 as shown in the side sectional view of FIG. 4.

Figure 4:
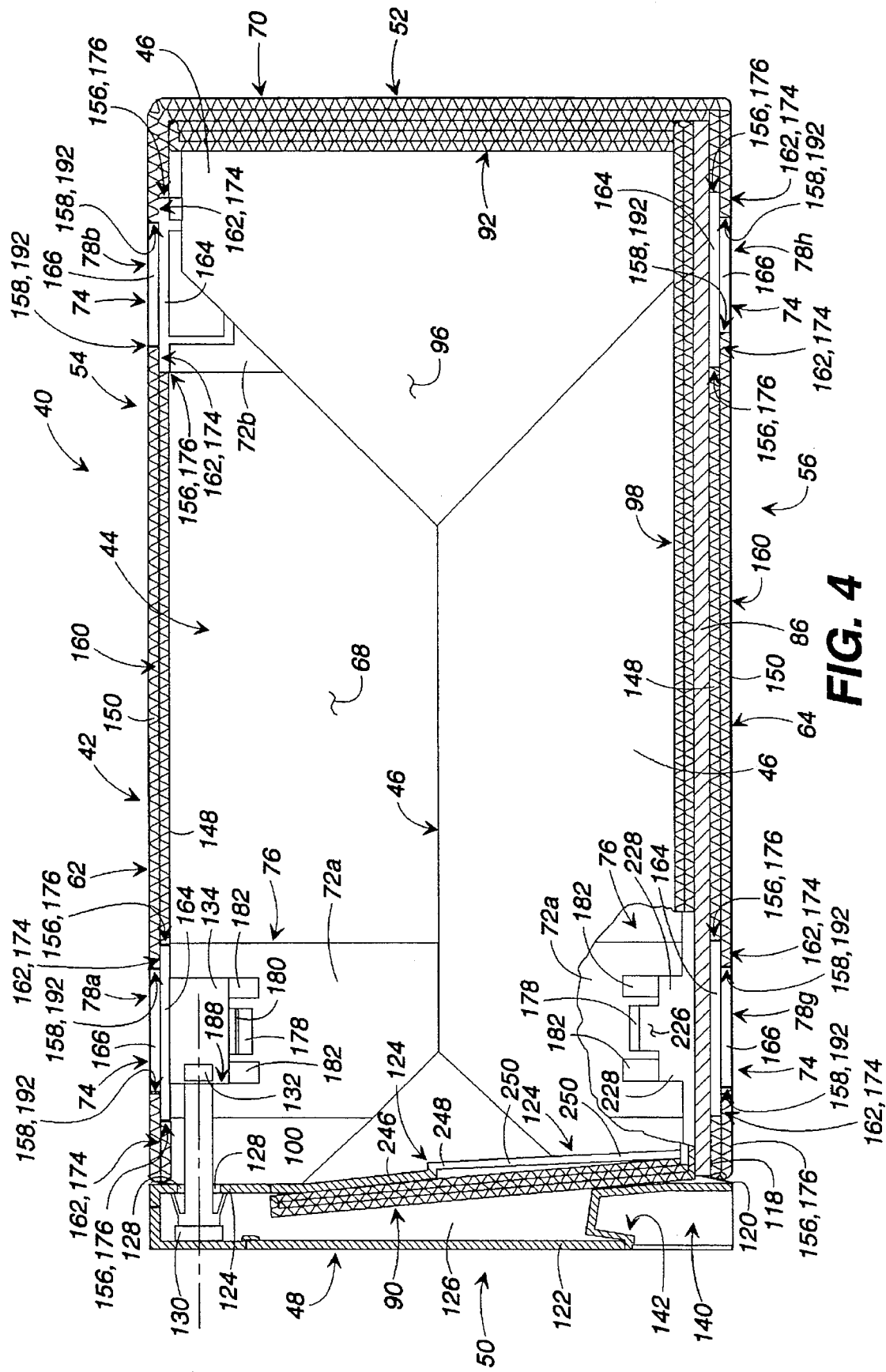
FIG. 4 is a sectional view of the multi-media storage container taken along line 4—4 of FIG. 1, in accordance with the preferred embodiment of the present invention.

The design of the face plate 48 and front panel 90 enables their mating during assembly of the multi-media storage container 40. Once mated, the face plate 48 provides a front 50 for the multi-media storage container 40 and may be used to slide the insert 46 into or out of the cavity 44. As seen in FIG. 4, the face plate 48 has a front wall 122 and an interfacing portion 124 that partially define an internal chamber 126 in which the front panel 90 of the insert 46 resides. The interfacing portion 124 presses against the front panel 90 of the insert 46, while its alignment fingers 120 are received by the notches 118 in the bottom panel 98 of the insert 46 to detachably couple the face plate 48 and the insert 46 together. The back wall 124 also defines an opening 128 through which a locking mechanism 130 extends toward the rear of the cavity 44. The locking mechanism 130 has a keeper 132 that rotates into a depression 134 defined by the columnar support 72 to create a locked condition and prevent the insert 46 from being easily removed from the cavity 44. When the keeper 132 is rotated out of the depression 134, an unlocked condition results and the insert 46 may be removed from the cavity 44. As shown in FIG. 1, the locking mechanism 130 additionally has a keyway 136 and a cover plate 138. A key (not shown) is inserted into the keyway 136 and turned by a user to rotate the keeper 132.

The face plate 48 also defines a finger pull recess 140 and lip 142 that are accessible from the front 50 of the multi-media storage container 40 (see FIGS. 1 and 4). The finger pull recess 140 and lip 142 enable a user to remove the insert 44 from the outer sleeve 42, if desired, by placing his fingers into the recess 140 and against the lip 142 while pulling outward on the face plate 48 (assuming, of course, that the locking mechanism 130 is in an unlocked condition). In addition, as shown in FIG. 1, the face plate 48 includes a label recess 144 and removable label cover 146 that snaps into place over the label recess 144. A user may place, if desired, an identification label in the label recess 144 by removing the label cover 146, inserting the label into the label recess 144, and replacing the label cover 146. The, preferably, clear plastic, label cover 146 maintains the label in place, while enabling the label to be clearly visible.

Figure 5:
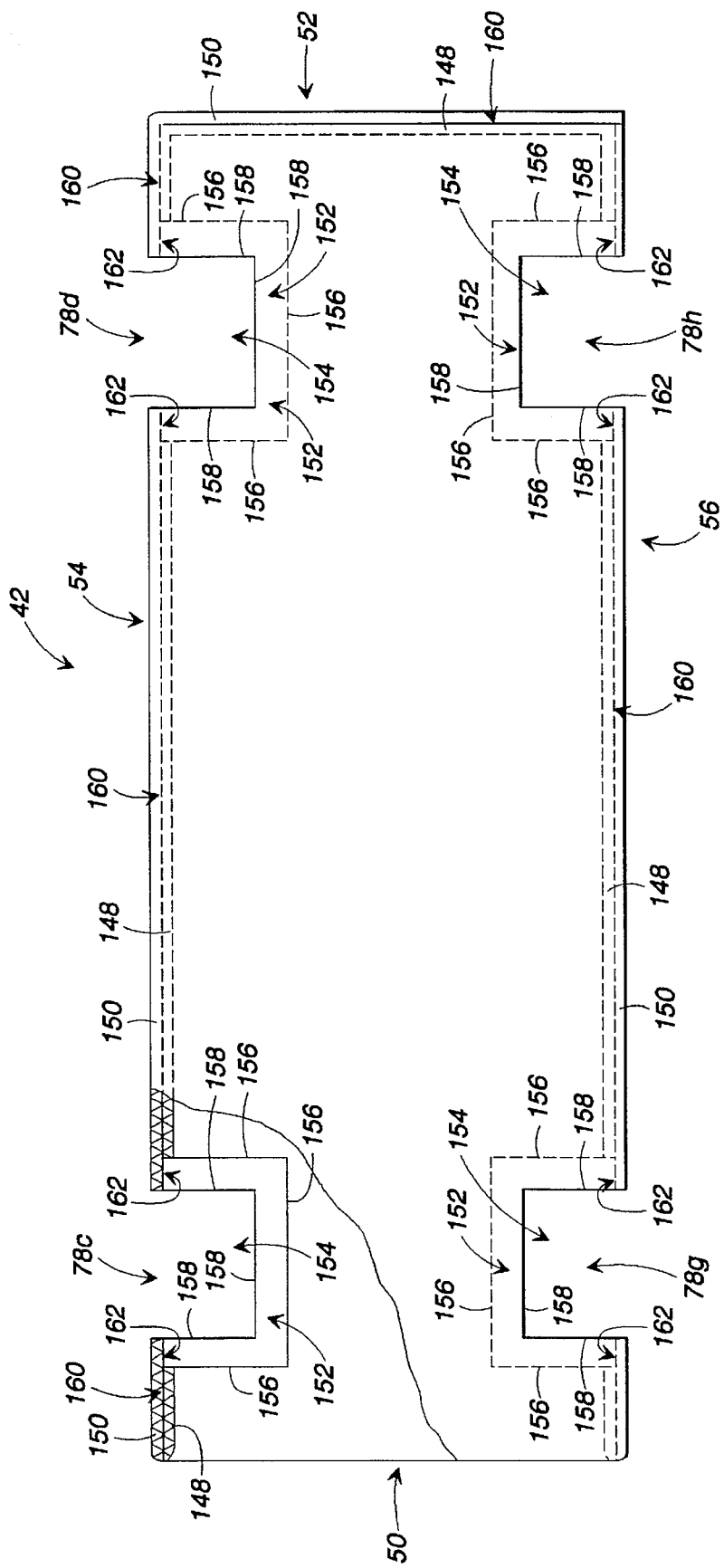
FIG. 5 is a partially cut-away, right side, elevational view of the outer sleeve of the multi-media storage container of FIG. 1.
Figure 6:
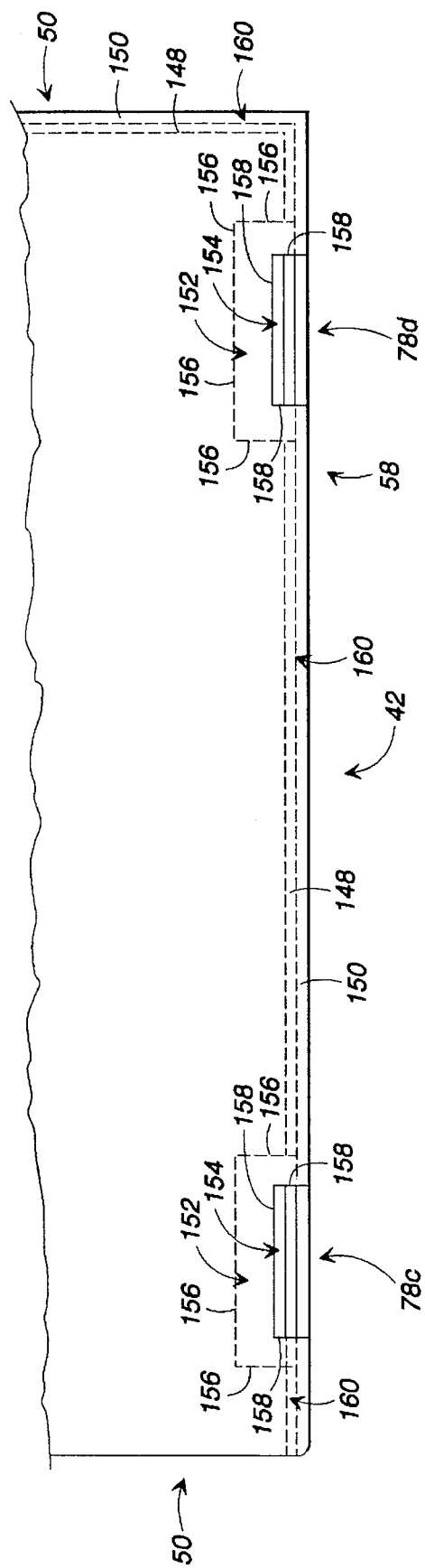
FIG. 6 is a partial, top view of the outer sleeve of the multi-media storage container of FIG. 1.

As discussed above, the mating portions 74 of the columnar supports 72 occupy aperatures 78 located along the right and left side edges 80 of the outer sleeve 42. In accordance with the preferred embodiment of the present invention and as illustrated in the cut away portion of the right side view of FIG. 5 and the partial top view of FIG. 6, the outer sleeve 42 comprises an interior ply 148 and an exterior ply 150 of corrugated cardboard, while each aperature 78 comprises an interior aperature 152 aligned with an exterior aperature 154. The interior aperature 152 extends through the interior ply 148 of corrugated cardboard and defines an interior aperature edge 156 extending around its perimeter. The exterior aperature 154 extends through the exterior ply 150 of corrugated cardboard and defines an exterior aperature edge 158 extending around its perimeter. Because the interior aperature 152 is larger than the exterior aperature 154, the interior surface 160 of the outer ply 150 is exposed to the cavity 44 and forms an aperature face 162 around the exterior aperature 154.

Figure 7:
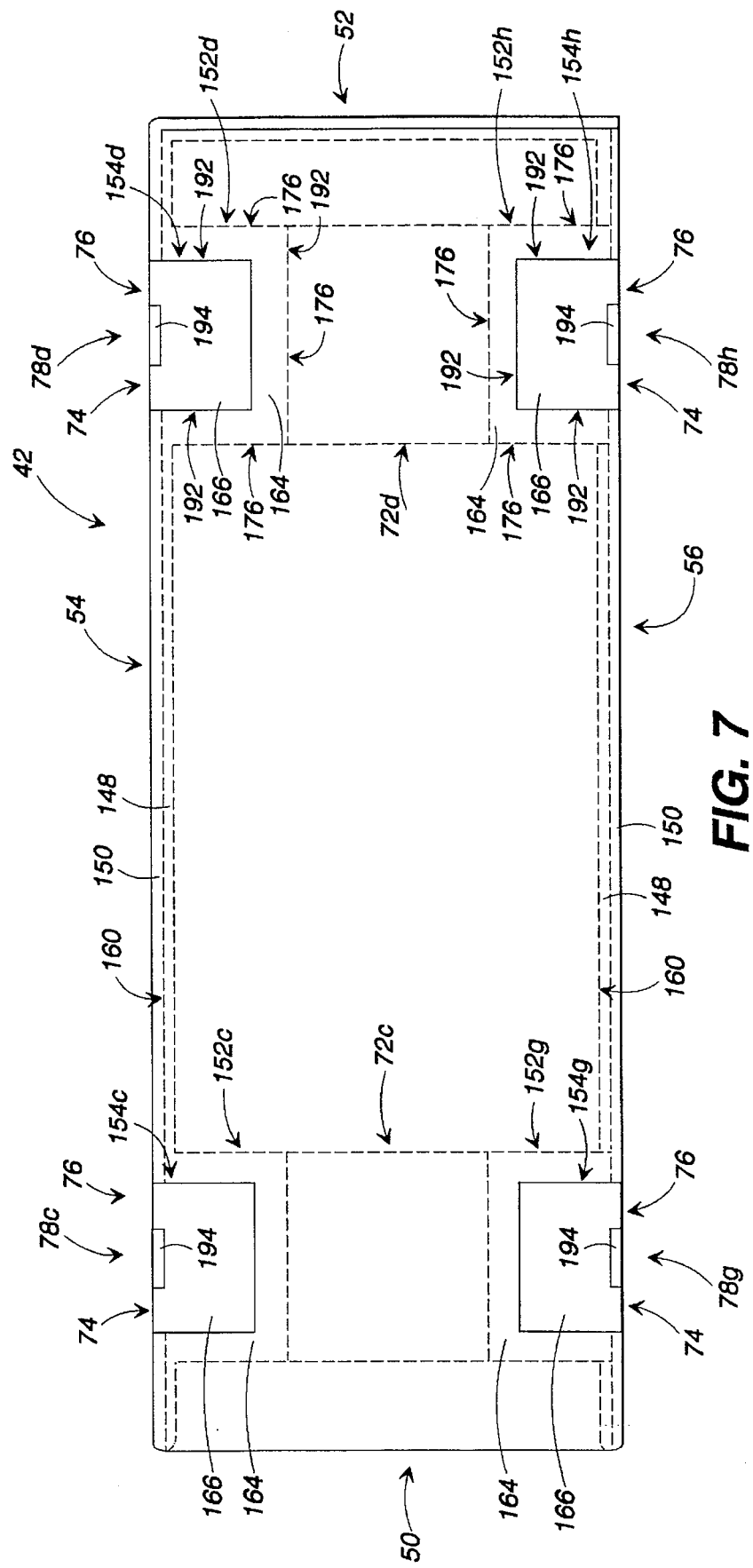
FIG. 7 is a right side, elevational view of the outer sleeve of the multi-media storage container of FIG. 1 showing the mating portions of the columnar supports residing in the aperatures.
Figures 8, 12:
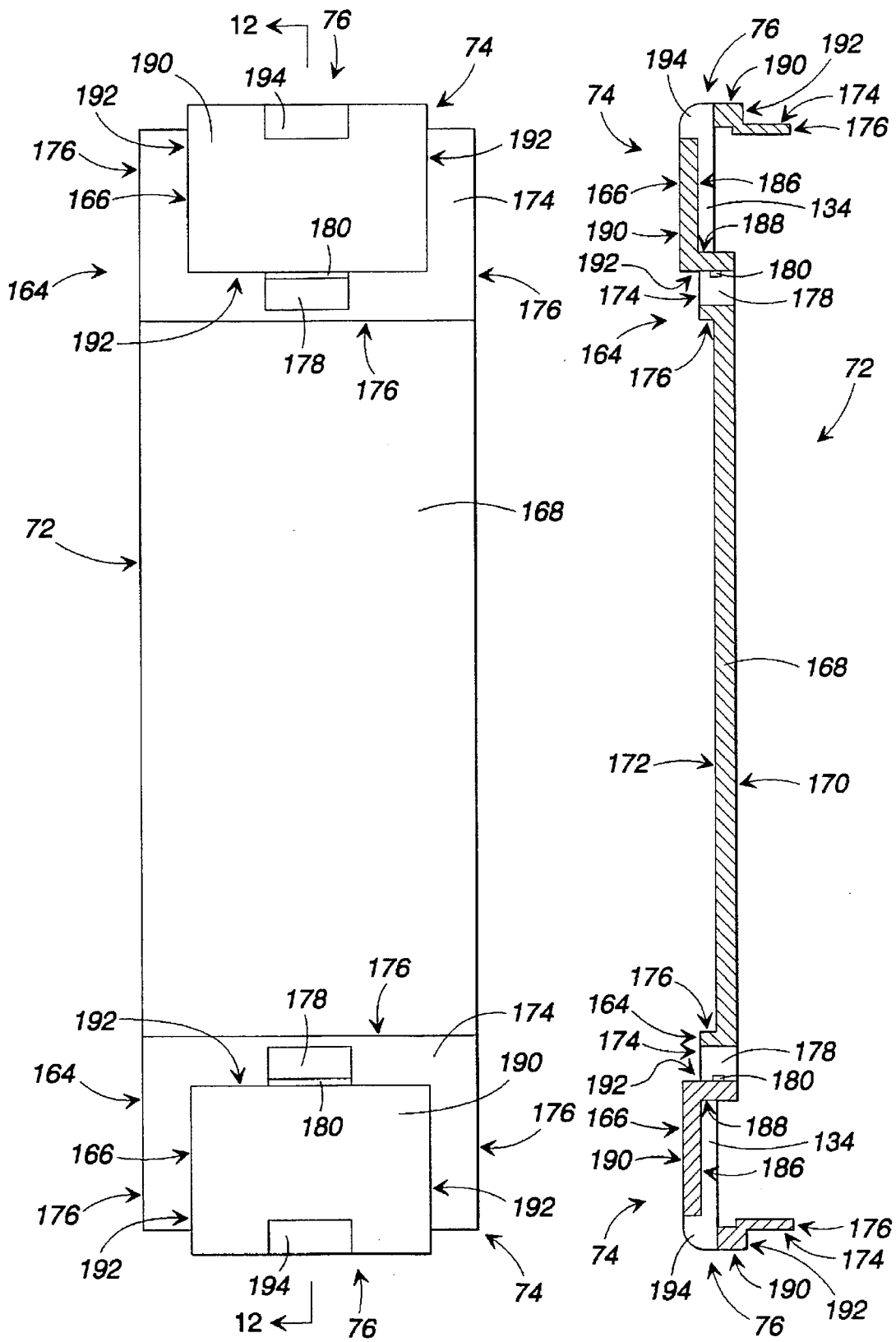
FIG. 8 is a front, elevational view of a columnar support in accordance with the preferred embodiment of the present invention.
FIG. 12 is a sectional view of the columnar support of FIG. 8 taken along line 12—12 of FIG. 8.
Figures 9, 10:
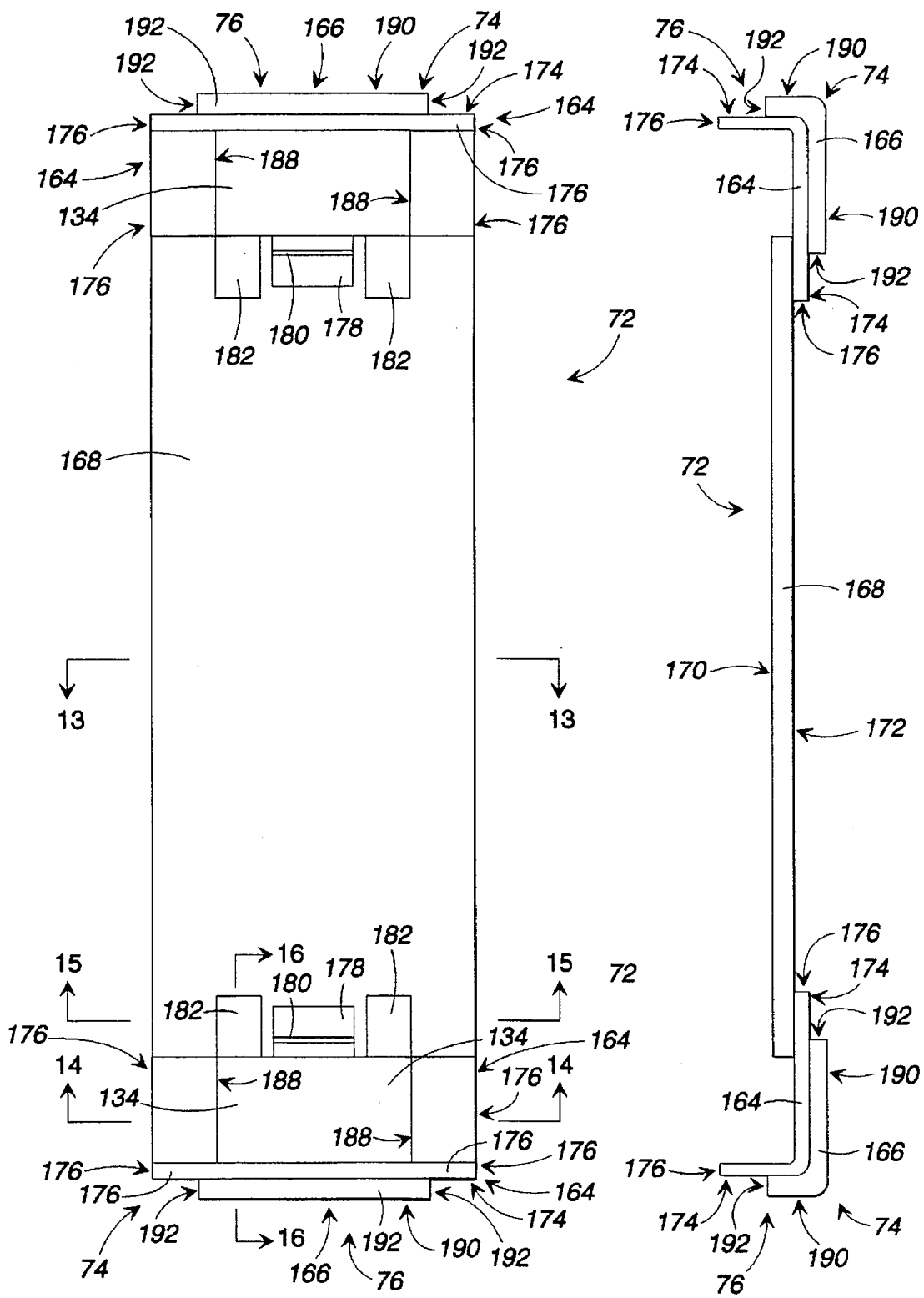
FIG. 9 is a back, elevational view of the columnar support of FIG. 8.
FIG. 10 is a side, elevational view of the columnar support of FIG. 8.
Figure 11:
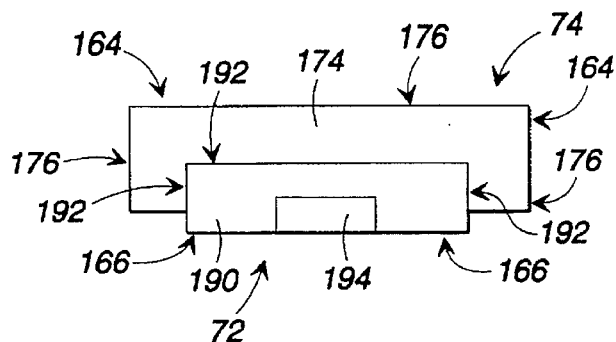
FIG. 11 is a top view of the columnar support of FIG. 8.
Figure 15:
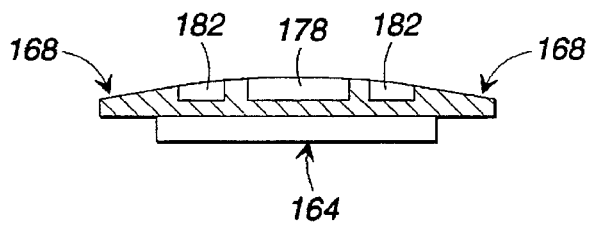
FIG. 15 is a sectional view of the columnar support of FIG. 8 taken along line 15—15 of FIG. 9.
Figure 13:
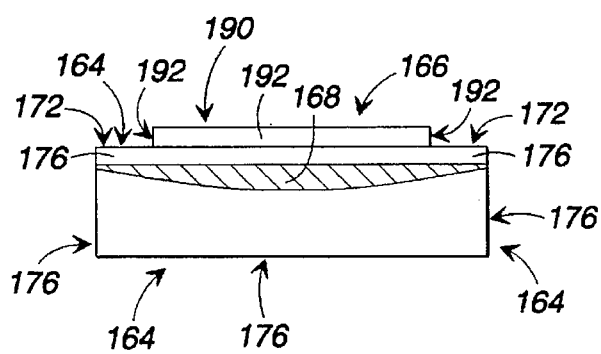
FIG. 13 is a sectional view of the columnar support of FIG. 8 taken along line 13—13 of FIG. 9.
Figure 16:
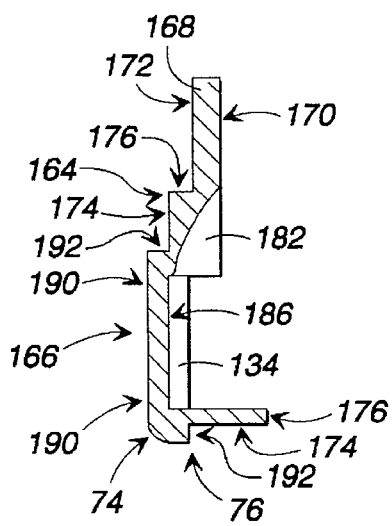
FIG. 16 is an isolated, sectional view of the columnar support of FIG. 8 taken along line 16—16 of FIG. 9.
Figure 14:
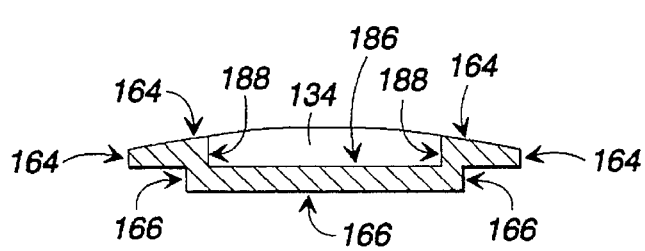
FIG. 14 is a sectional view of the columnar support of FIG. 8 taken along line 14—14 of FIG. 9.

In accordance with the preferred embodiment of the present invention and using FIG. 7 for purposes of illustration, a single columnar support 72 occupies two vertically-opposed aperatures 78c,g,78d,h. To properly interface with the vertically-opposed aperatures 78c,g,78d,h and their interior and exterior aperatures 152c,g,152d,h, 154c,g,154d,h, the mating portions 74 are positioned symmetrically at the ends 76 of each columnar support 72 with each mating portion 74 having an interior mating portion 164 and an exterior mating portion 166 as shown in FIGS. 8–16 (note that FIGS. 8 and 9 display a front (or sleeve side) and a back (or cavity side), respectively, of a columnar support 72). The mating portions 74, including the interior and exterior mating portions 164,166, as seen in the side view of FIG. 10, are, generally, shaped to follow the contour of the outer sleeve 42 and aperatures 78. The mating portions 74 are joined by an elongated web member 168 having an interior surface 170 and an exterior surface 172. Because the interior surface 170 is exposed to the cavity 44, the interior surface 170, as depicted in the sectional view of FIG. 13, is dome-shaped to reduce the opportunity for the insert 46 to become caught on a web member 168 when a user slides the insert 46 into or out of the cavity 44. Similarly, as illustrated in the sectional views of FIGS. 14 and 15, the areas of the interior mating portions 164 that are exposed to the cavity 44 have a dome-shape as well.

Each interior mating portion 164 of a columnar support 72 has an interior mating face 174 and defines an interior mating shoulder 176 around its periphery. As seen best in the sectional view of FIG. 12, each interior mating portion 164 also defines, preferably, a rectangular-shaped latch receiving opening 178 that extends through the interior mating portion 164. A latch catch 180 protrudes into the opening 178 to enable the columnar support 72 to releasably latch to the base plate 86. Each interior mating portion 164 additionally defines a depression 134 and two arcuate recesses 182 in its cavity side 184 (see FIG. 9). The depression 134 has, preferably, a rectangular shape (see FIG. 9) and includes a depression bottom 186 and depression walls 188 as displayed in the sectional view of FIG. 14. The arcuate recesses 182, also shown in FIGS. 9, 15 and 16, extend into the depression 134 on either side of the latch receiving opening 178.

Figure 51:
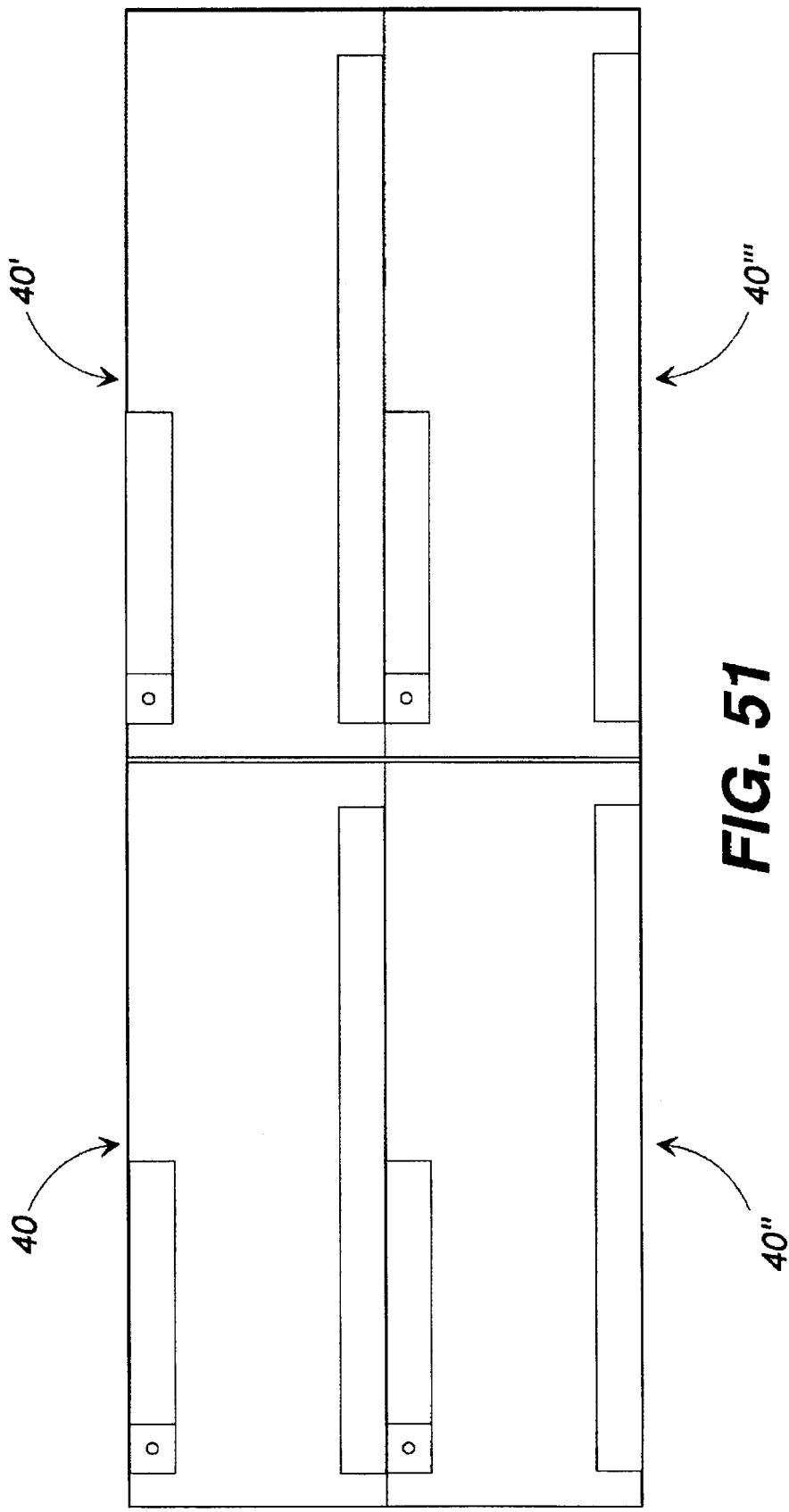
FIG. 51 is a front, elevational view of a plurality of multi-media containers joined together.

Similar to the interior mating portion 164, the exterior mating portion 166 has an exterior mating face 190 and defines an exterior mating shoulder 192 around its periphery. The exterior mating face 190 also defines an interconnection clip receptacle 194 for receiving a clip (not shown) that enables interconnection of the multi-media storage container 40 to, at least, a second multi-media storage container 40' (see FIG. 51). As shown in the sectional view of FIG. 12, the interconnection clip receptacle 194 extends through the interior and exterior mating portions 164,166 and into the depression 134 defined by the interior mating portion 164.

Figure 17:
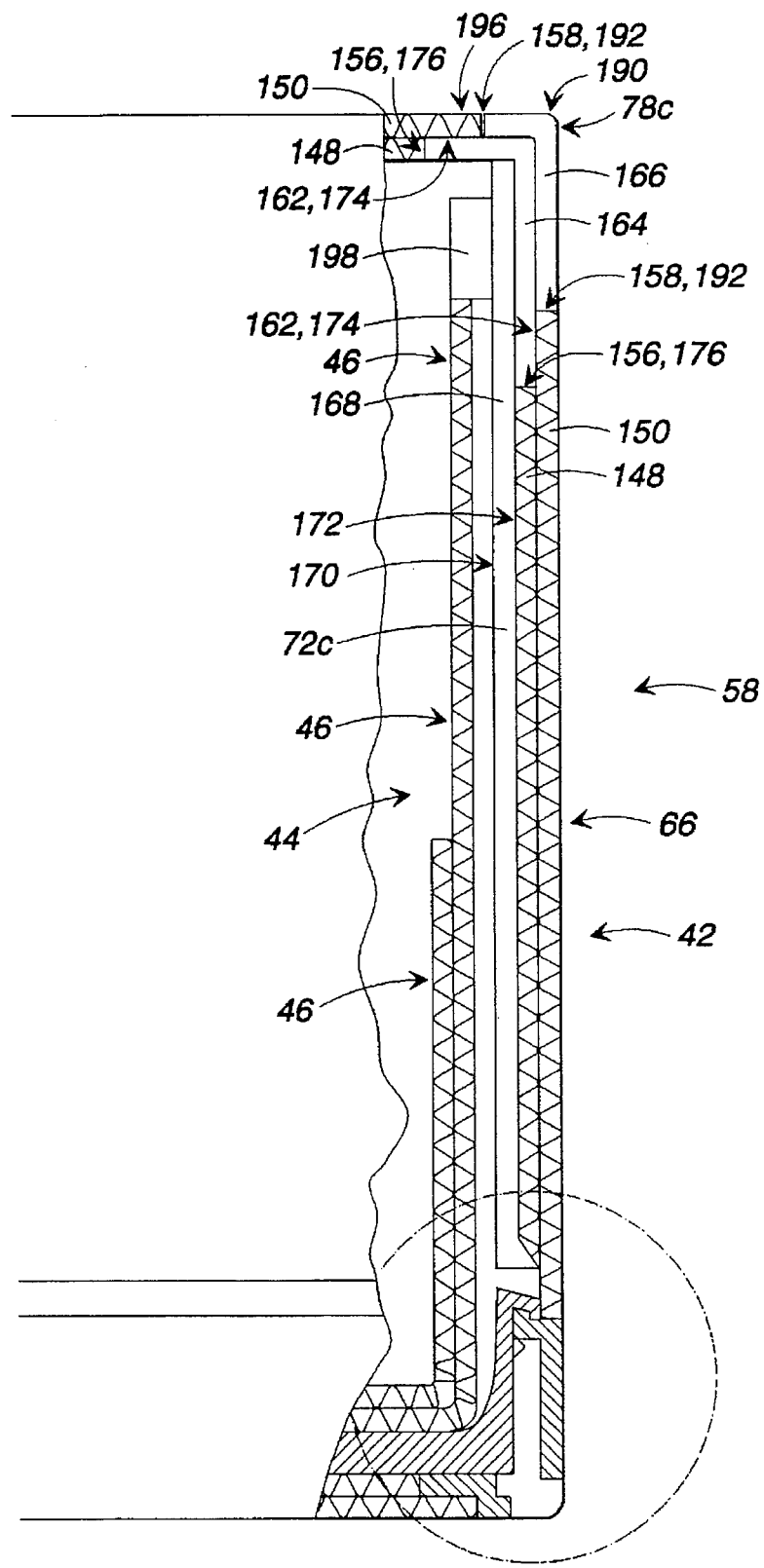
FIG. 17 is a partial, front sectional view of the multi-media storage container of FIG. 1 taken along line 17—17 of FIG. 1.

The side sectional view of FIG. 4 and the partial, front sectional view of FIG. 17 display columnar supports 72a,c located, respectively, near the front 50 of the cavity 44. Columnar support 72a (see FIG. 4) mates with the left side panel 68, while columnar support 72c (see FIG. 17) mates with the right side panel 66. Both figures display an interior mating face 174 as it contacts and rests adjacent to the aperature face 162, while the interior mating shoulder 176 abuts the interior aperature edge 156. The exterior mating face 190 extends through the exterior aperature 154 to fit flush with the exterior surface 196 of the exterior ply 150 of corrugated cardboard, while the exterior mating shoulder 192 abuts the exterior aperature edge 158. The exterior surface 172 of the web member 168 resides adjacent the interior ply 148 of the outer sleeve 42, while the interior surface 170 is exposed to the cavity 44. As displayed in FIG. 4, the depression 134 receives the keeper 132 of the lock mechanism 130. In the locked condition depicted in FIG. 4, the keeper 132 rests against a depression wall 188 to prevent the insert 46 from being removed from the cavity 44 enough to expose any portion of the reservoir 100. An insert stop 198, seen in FIG. 17, is received by the depression 134 and allows the insert 46 to be removed from the cavity 44, if desired, enough to expose the entire reservoir 100. However, the insert stop 198 prevents the insert 46 from being removed entirely from the cavity 44 without carefully manipulating the position of the insert 46 relative to the outer sleeve 42 and cavity 44. As a result, the insert stop 198 typically prevents the insert 46 from accidentally being pulled completely out of the cavity 44.

As noted above and shown in FIGS. 2 and 4, the base plate 86 rests within the cavity 44 between the bottom panel 64 of the outer sleeve 42 and the bottom panel 98 of the insert 46. The base plate 86, illustrated in the top and front views of FIGS. 18 and 19, respectively, is, preferably, of one-piece construction and has, generally, a rectangular shape with a horizontal portion 200 extending from a front 202 to a back 204 with vertical uprights 206 sweeping upward at its right and left sides 208,210. The horizontal portion 200 includes a plurality of cut-outs 212 between the front 202 and back 204 of the base plate 86 that extend between a top surface 214 and bottom 216 of the base plate 86. The cut-outs 212 divide the top surface 214 into a center surface 218 and side surfaces 220 that are grooved from the front 202 to the back 204 to reduce side to side slippage of the insert 46. The thickness, "A", of the base plate 86 is, preferably, greatest at the midpoint 222 of the center surface 218 and lessens in a tapering fashion toward the right and left sides 208,210. The increased thickness at the midpoint 222 of the center surface 218 provides support underneath the bottom panel 98 of the insert 46 to limit downward bowing of the bottom panel 98 when the insert 46 is loaded with media. Note, however, that while the thickness, "A", of the base plate 86 is, preferably, greatest at the midpoint 222 of the center surface 218, it is, neverthelesss, reduced where possible to decrease the quantity of material required for manufacturing the base plate 86. Therefore, as illustrated in the sectional views of FIGS. 20 and 21, a plurality of channels 224 are defined in the bottom 216 of the base plate 86 to accomplish this goal. The channels 224 are strategically located so that any adverse effect on the structural rigidity of the base plate 86 is limited.

Figure 18:
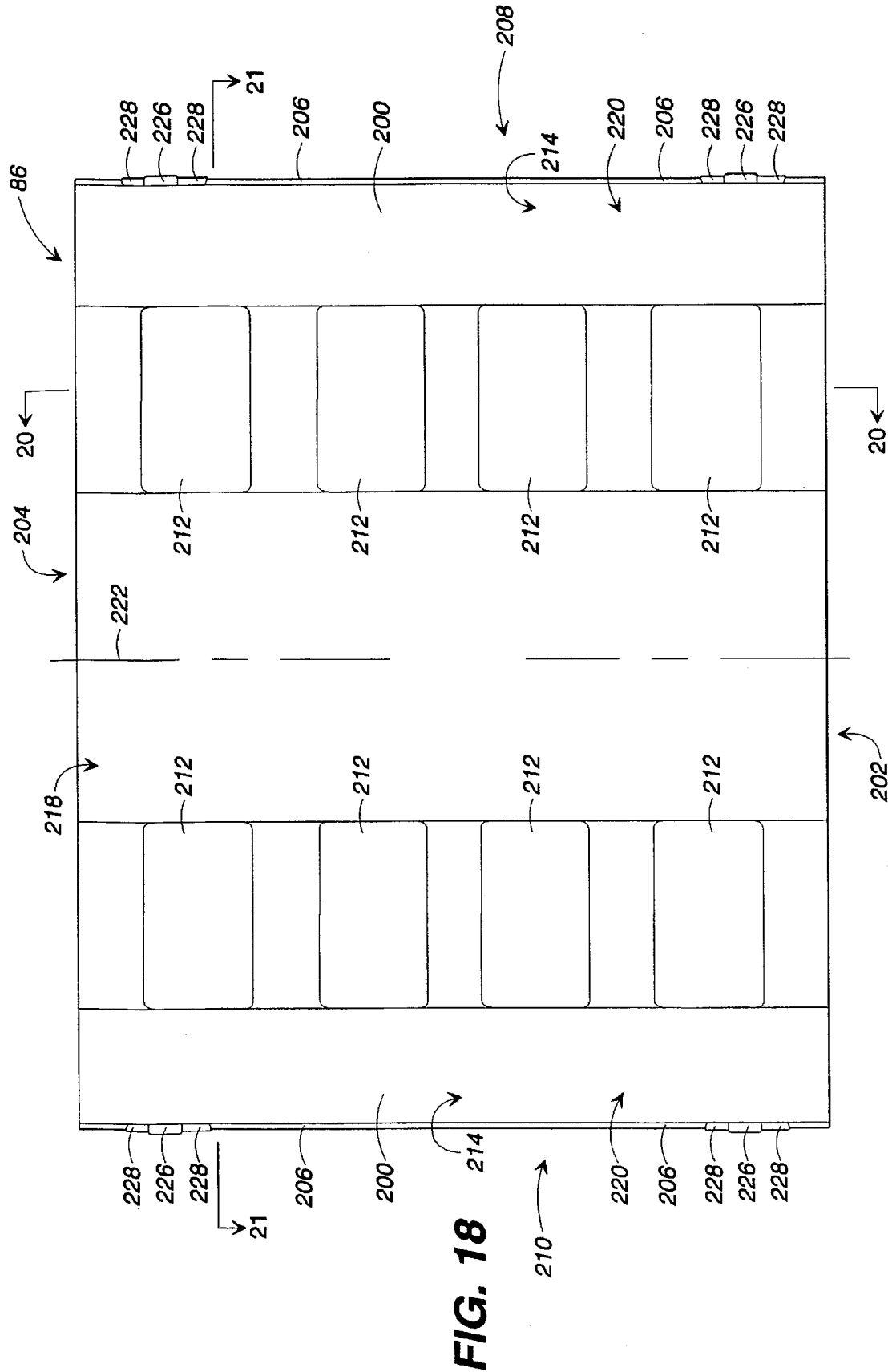
FIG. 18 is a top view of a base plate in accordance with the preferred embodiment of the present invention.
Figure 22:
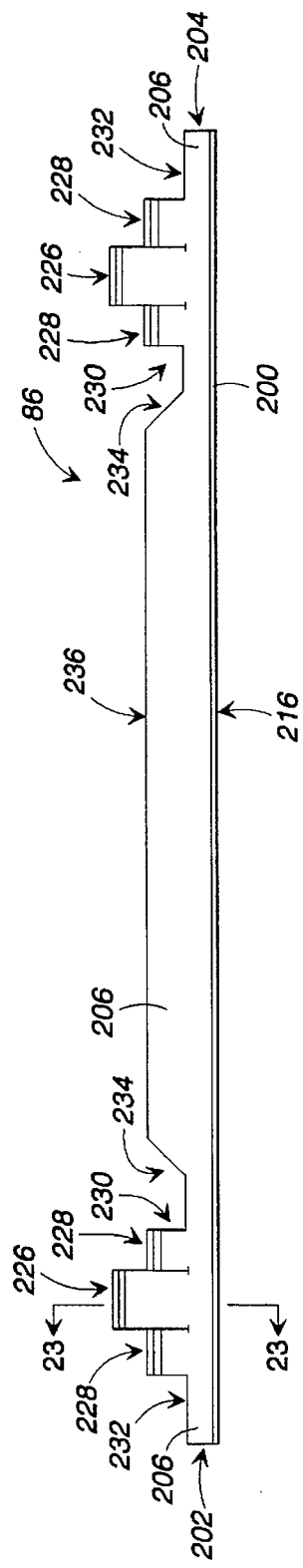
FIG. 22 is a right side, elevational view of the base plate of FIG. 18.

The vertical uprights 206 extend between the front and back 202,204 of the base plate 86 as shown in FIGS. 18 and 22. Sets of latching hooks 226 and guide paws 228, integrally formed as part of the uprights 206, are located near the front 202 and back 204 of the base plate 86 to releasably couple the base plate 86 to the columnar supports 72. In the areas around each set of latching hooks 226 and guide paws 228 (see the right side view of FIG. 22), the vertical uprights 206 include inner and outer cut-outs 230,232 to enhance interfacing with the columnar supports 72. The inner cut-outs 230 share a tapered edge 234 with a medial portion 236 of the vertical uprights 206. The medial portion 236 abuts and rests adjacent to the interior ply 148 of the corrugated material of the outer sleeve 42.

Figure 23:
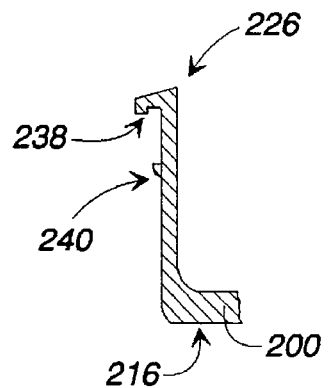
FIG. 23 is a sectional view of the latch hook of FIG. 22 taken along line 23—23 of FIG. 22.
Figure 24:
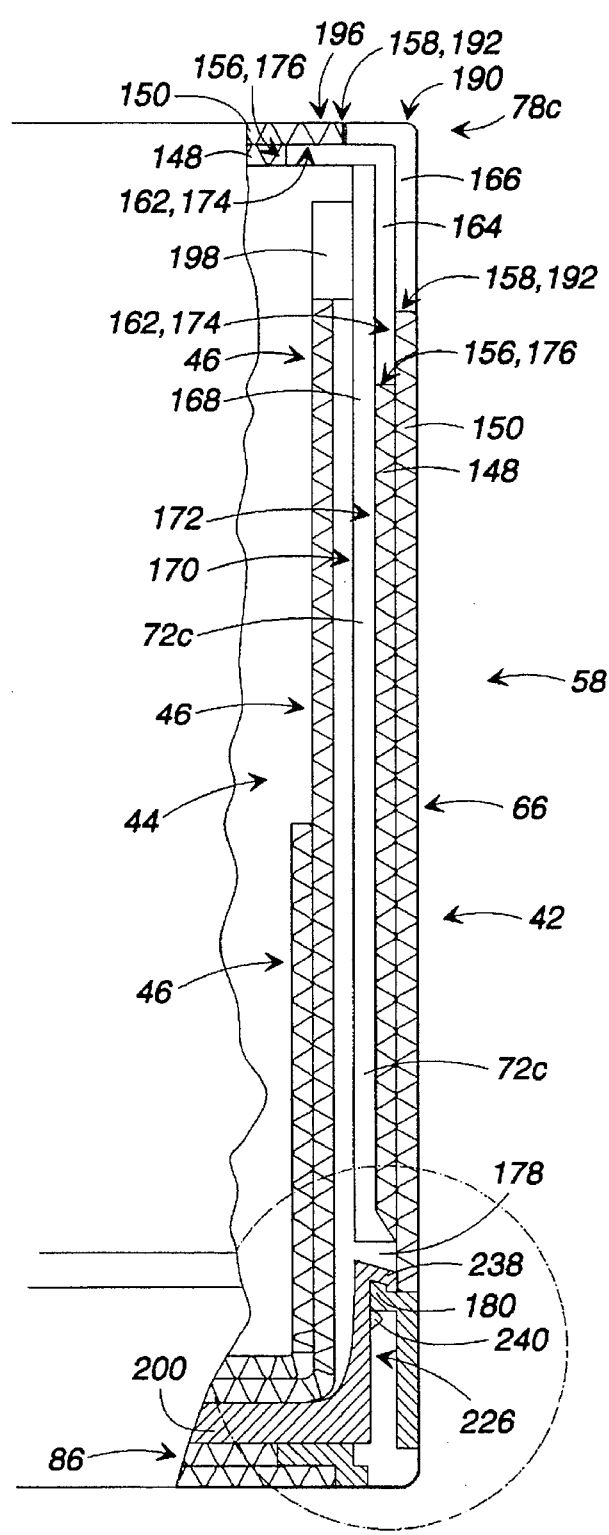
FIG. 24 is a partial, front sectional view of the multi-media storage container of FIG. 1 taken along line 17—17 and displaying the interconnection between the base plate and the columnar support in the circular inset.

As seen in the front view of FIG. 19, the vertical uprights 206a,b are mirror images of each other. Note that the latching hooks 226 extend vertically beyond the guide paws 228. Also note that the latching hooks 226 and guide paws 228 face away from the base plate 86 to enable interfacing with the latch receiving opening 178 and depresssion 134, respectively, of the columnar supports 72. The sectional view of a latching hook 226 in FIG. 23 discloses a hook portion 238 and a shoulder 240. The hook portion 238, as illustrated in the circular inset of FIG. 24, extends into the latch receiving opening 178 of the columnar support 72 and receives the latch catch 180, while the shoulder 240 resides under the latch catch 180 to prevent vertical travel of the latch catch 180 away from the hook portion 238.

Figure 25:
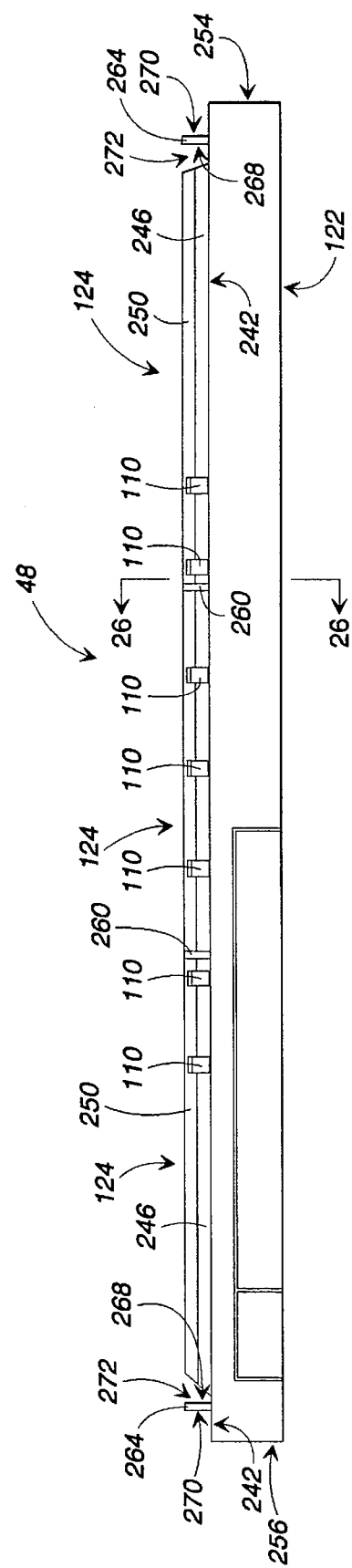
FIG. 25 is a top view of a face plate in accordance with the preferred embodiment of the present invention.

In accordance with the preferred embodiment of the present invention, the multi-media storage container 40 includes the, generally, hollow face plate 48 discussed briefly above. The top view of FIG. 25 shows the uniquely designed interfacing portion 124 extending from a back wall 242 of the face plate 48. The interfacing portion 124 and the front wall 122 work in conjunction with internal ribs 244 to define the internal chamber 126 (see the sectional view of FIG. 26) in which the front panel 90 of the insert 46 resides (see also FIG. 4). The interfacing portion 124 is comprised of an upper portion 246, a transition portion 248, and a lower portion 250 (see FIG. 26) that angle away from the back wall 242 to properly receive the front panel 90 of the insert 46. The upper portion 246 engages the front panel 90, while the lower portion 250, offset by the transition portion 248, extends inside the reservoir 100 of the insert 46. There, the alignment fingers 120, extending and tapering from the lower portion 250, reside within the notches 118 in the bottom panel 98 of the insert 46. The alignment fingers 120, also seen in the back view of FIG. 27 and the bottom view of FIG. 28, preferably, have a channel shape and are, preferably, evenly spaced across the lower portion 250. The engagement of the alignment fingers 120 and the notches 118 tends to create squeezing pressure on the front panel 90 of the insert 46 between the upper portion 246 and the internal ribs 244. The uniquely shaped internal ribs 244 extend between the front wall 122 and the back wall 242 and contact a top wall 252. In addition to partially defining the internal chamber 126, the internal ribs 244 improve the structural rigidity of the face plate 48. As seen in the bottom view of FIG. 28 (where the finger pull recess 140 is not shown to make the internal ribs 244 visible), the internal ribs 244 are, preferably, evenly spaced between the right and left sides 254,256 of the interfacing portion 124.

The transition and lower portions 248,250 of the face plate 48 define a plurality of slots 110 with each slot 110 receiving, if desired, tabs 104c of a media divider 106 (see FIGS. 34–36). The slots 110, best seen in FIG. 27, extend downward from the transition portion 248 into proximity with the alignment fingers 120. Each slot 110 has sides 258 that, preferably, taper toward one another as the slot 110 extends downward. By tapering in this way, the sides 258 of the slot 110 tend to squeeze together tabs 104c of the right and left side panels 292,294 when they are inserted into the slot 110, thereby partially securing a media divider 106 in place.

Figure 26:
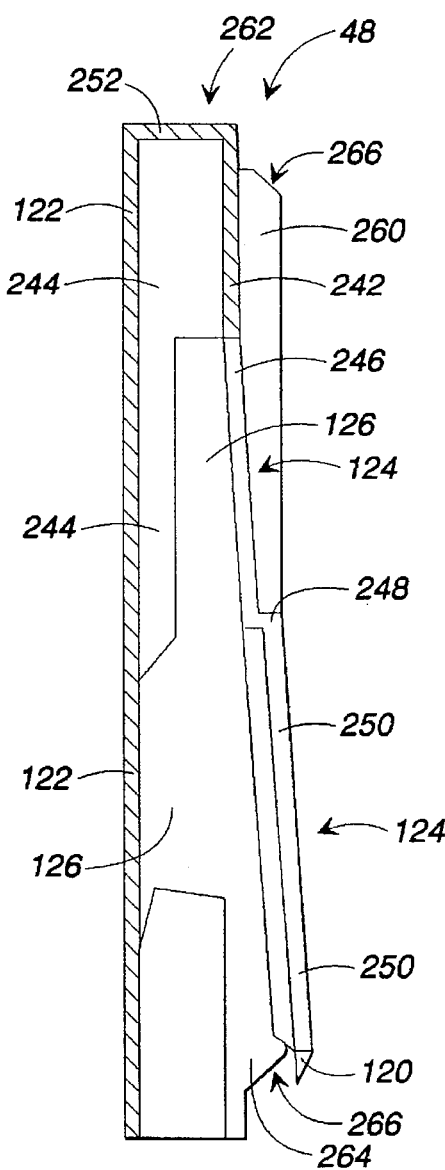
FIG. 26 is a sectional view of the face plate of FIG. 25 taken along line 26—26 of FIG. 25.
Figure 29:
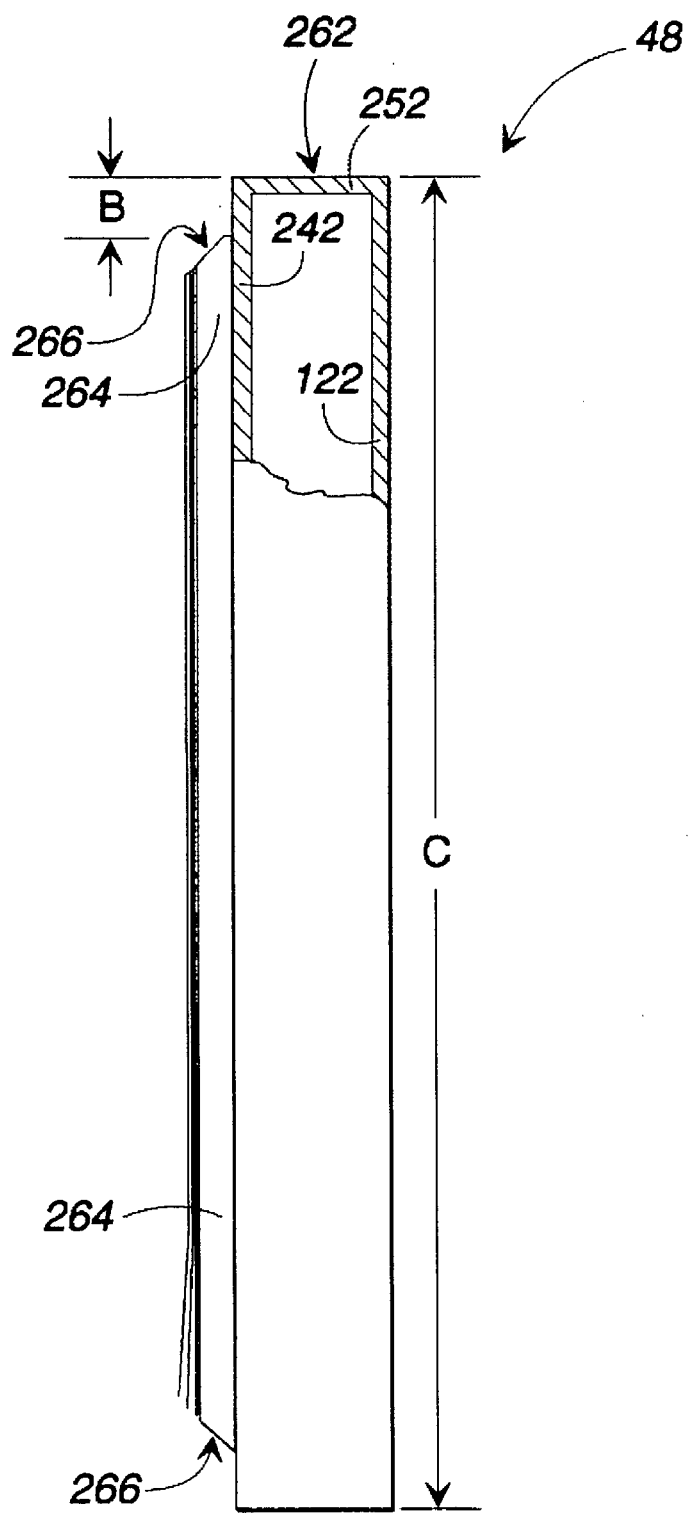
FIG. 29 is a left side, elevational view of the face plate of FIG. 25 with a portion cut away to display its, generally, hollow construction.

As seen in FIGS. 25, 26 and 27, the face plate 48 also has external ribs 260 that protrude from the back wall 242 and the lower portion 250 to enhance the structural strength of the face plate 48. Note that the external ribs 260 are offset a distance, "B", from the top 262 of the face plate 48 to allow room for the top panel 62 of the outer sleeve 42 to abut the back wall 242. In addition to the external ribs 260, the face plate 48 has side ribs 264 that protrude from the back wall 142 of the face plate 48 (see FIGS. 25–29). The side ribs 264 are located near the right and left sides 254,256 of the face plate 48 (see FIGS. 25, 27 and 28) and span nearly the entire height, "C", (see FIG. 29) of the face plate 48. Note that the side ribs 264, like the external ribs 260, are offset a distance, "B", from the top 262 of the face plate 48 to allow the top panel 62 of the outer sleeve 42 to abut the back wall 142. The side ribs 264 and the external ribs 260, preferably, have chamfered surfaces 266 to better guide the top and bottom panels 62,64 of the outer sleeve 42 into contact with the back wall 142. The side ribs 264 also have interior and exterior sides 268,270 as shown in FIGS. 25, 27, and 28. An exterior side 270 extends adjacent to the right and left side panels 66,68 of the outer sleeve 42 when the face plate 48 is in contact with the outer sleeve 42. The interior sides 268 are adjacent to and engage the right and left side panels 94,96 of the insert 46. To enable such engagement, the interfacing portion 124 is offset and tapers away from the side ribs 264 to define side panel engagement gaps 272 (see FIGS. 25 and 27) in which the side panels 94,96 reside.

The face plate 48 additionally defines a lock cavity 274 (see FIG. 28) that receives the locking mechanism 130. The opening 128 through which the locking mechanism 130 protrudes is visible in the back view of FIG. 27. In addition, the face plate 48 defines a keyway opening 276 to receive the keyway 136 of the locking mechanism 130.

The insert stop 198, in accordance with the preferred embodiment of the present invention, is positioned, if employed, in the uppermost depression 134 of columnar support 72c as shown in FIG. 17. The insert stop 198 (see FIGS. 30–33) includes a plug portion 278 comprised of depression engaging elements 280 that protrude from a face portion 282 to engage the depression bottom and walls 186,188. The depression engaging elements 280 and the face portion 282 define a shoulder 284 that extends around the depression engaging elements 280. The shoulder 284 abuts the interior mating portion 164 of the columnar support 72c. A generally, triangular shaped insert engaging portion 286 extends from the face portion 282 as illustrated in the front and top views of FIGS. 30 and 33. The insert engaging portion 286 has a forwardly receding engaging edge 288 that contacts a tapered edge 290 (see FIG. 47) of the right side panel 94 near the back of the insert 46 when a user attempts to remove the insert 46 from the outer sleeve 42. The contact between the engaging edge 288 and the tapered edge 290 prevents the insert 46 from being fully removed from the outer sleeve 42. However, the triangular shape of the insert engaging portion 286 enables the tapered edge 290 of the right side panel 94 to be slid under the insert stop 198 by a user and, hence, enables the insert 46 to be fully removed from the outer sleeve 42 by tilting the front panel 90 of the insert 46 upward while pulling the insert 46 from within the outer sleeve 42.

A media divider 106, depicted in FIGS. 34–36, is, preferably, of one-piece construction and is manufactured, in accordance with the preferred embodiment of the present invention, from a single ply of corrugated cardboard of less thickness than that used to manufacture the outer sleeve 42 and insert 46. Each media divider 106 includes a right side panel 292 and a left side panel 294. The right and left side panels 292,294 are joined along a fold 296 at a top 298. Each panel 292,294 of a media divider 106 has a bottom edge 300 and ends 302,304, from which a plurality of tabs 104 extend. Tabs 104a are located along the bottom edge 300 of each portion 292,294 and are positioned to interact with slots 102 of the interior bottom panel 542 of the insert 46. Tabs 104b, located at end 302 of each portion 292,294, are positioned to interface with slots 108 of the interior back panel 536 of the insert 46, while tabs 104c, located at end 304 of each portion 292,294, are positioned to mate with slots 110 of the face plate 48. A media divider 106 is inserted, if desired, by squeezing the right and left panels 292,294 together, while appropriately mating the tabs 104a,b,c with the slots 102, 108,110.

Figure 38:
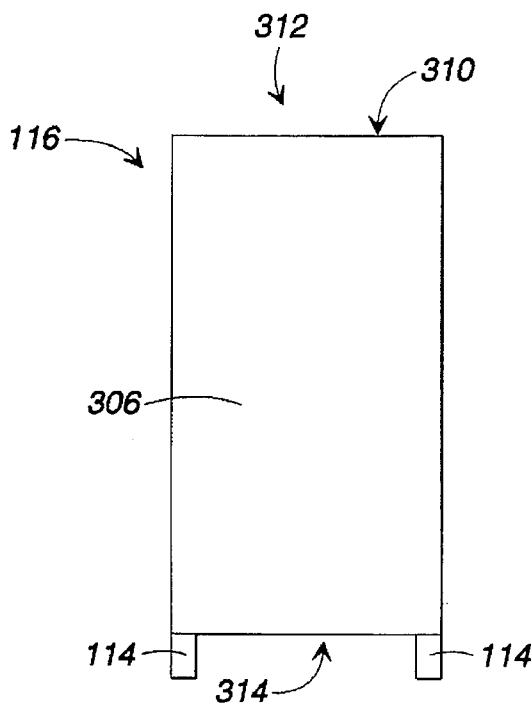
FIG. 38 is a front, elevational view of the media support of FIG. 37.
Figure 37:
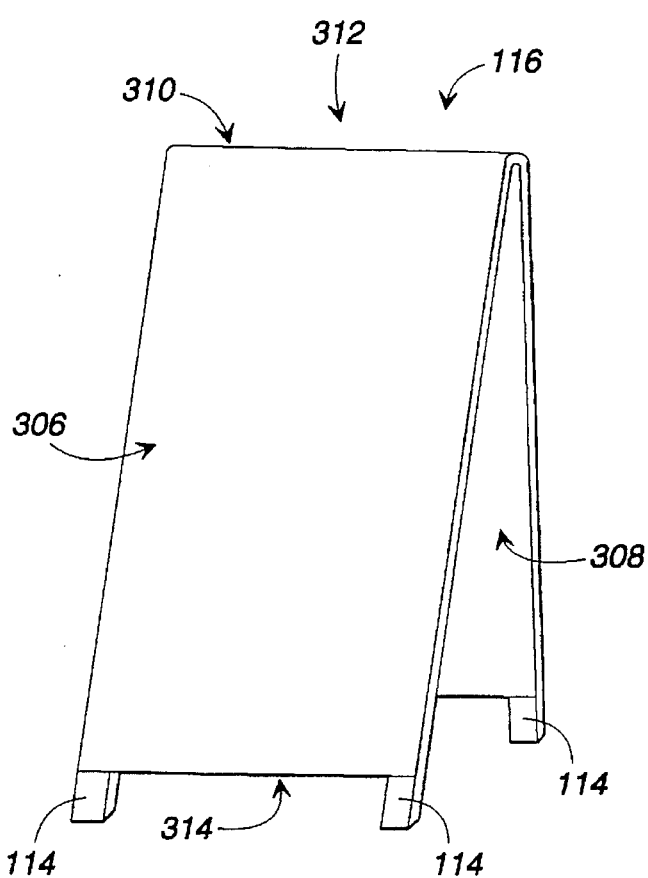
FIG. 37 is a side, perspective view of a media support in accordance with the preferred embodiment of the present invention.
Figure 39:
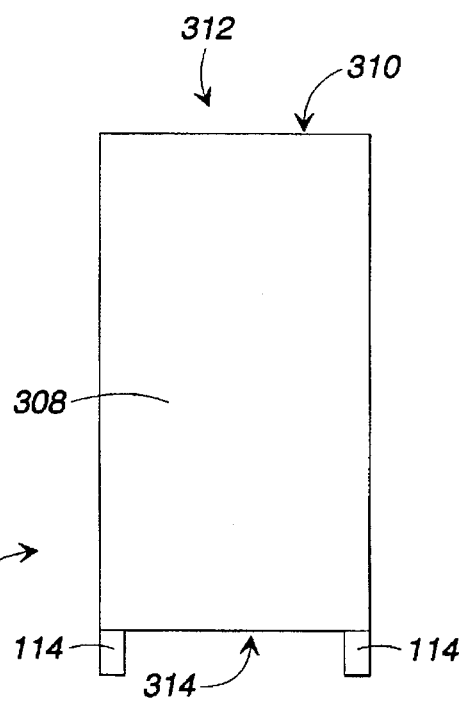
FIG. 39 is a back, elevational view of the media support of FIG. 37.

A media support 116, in accordance with the preferred embodiment of the present invention and displayed in FIGS. 37–39, is, similar to a media divider 106, preferably manufactured from a single ply of corrugated cardboard of less thickness than that used to manufacture the outer sleeve 42 and insert 46. Each media support 116 has a front panel 306 and a back panel 308 joined along a fold 310 at a top 312. Each panel 306,308 defines a bottom edge 314 from which a plurality of tabs 114 extend. If desired by a user, a media support 116 is inserted into the reservoir 100 of the insert 46 by mating the tabs 114 with the slots 112 defined in the interior bottom panel 542.

Figure 40:
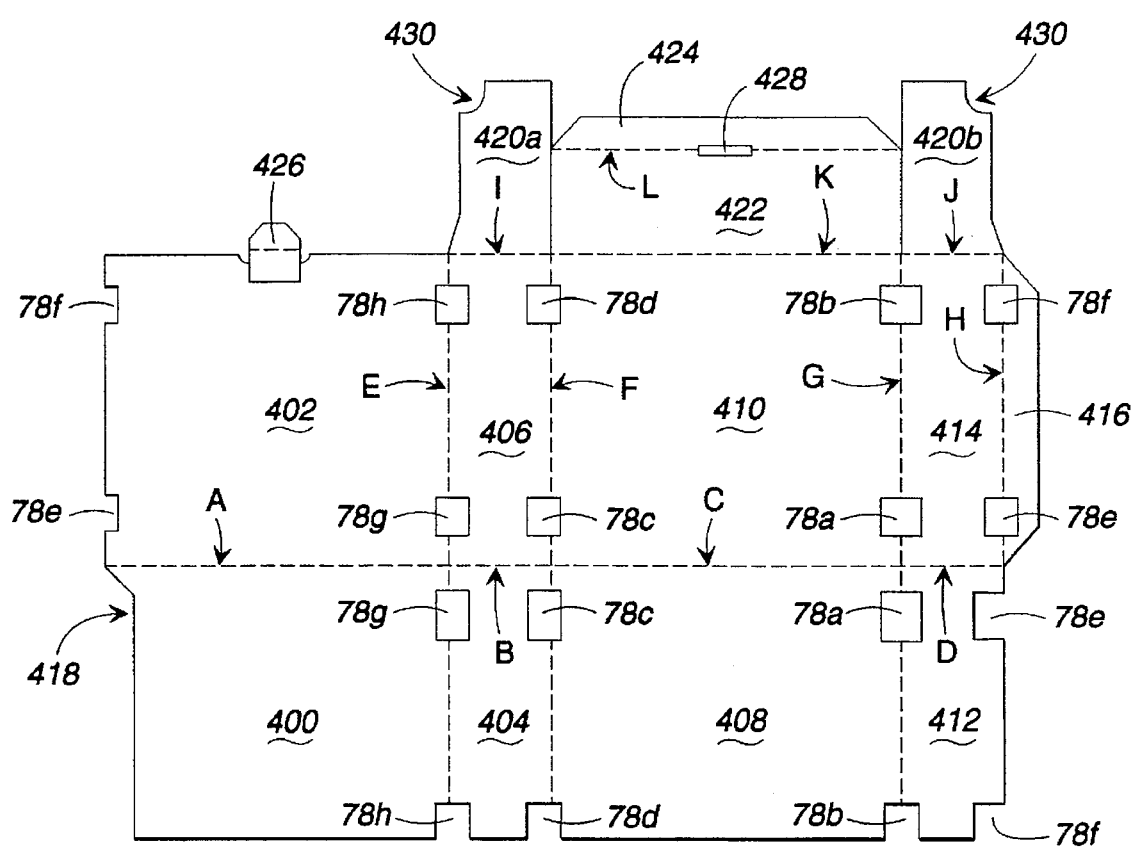
FIG. 40 is a cut and fold pattern for the outer sleeve of FIG. 1.

The outer sleeve 42 of the multi-media storage container 40 is manufactured, preferably, by punching the outer sleeve 42 from a single-ply sheet of corrugated cardboard on a punch press according to the pattern illustrated in FIG. 40. Note that in FIG. 40, solid lines indicate cuts that are made, while dashed lines indicate folds that are made. Once, the outer sleeve 42 is punched, the double-ply panels 64,66,62, 68 of the assembled outer sleeve 42 (see FIGS. 41–45) are, respectively, formed by first folding: an interior bottom panel 400 so that it rests adjacent to an exterior bottom panel 402; an interior right side panel 404 so that it rests adjacent to an exterior right side panel 406; an interior top panel 408 so that it rests adjacent to an exterior top panel 410; and, an interior left side panel 412 so that it rests adjacent to an exterior left side panel 414 using fold lines "A", "B", "C", and "D", respectively. Then, the outer sleeve 42 is given its, generally, elongated rectilinear shape by folding the exterior panels 402,406,410,414 along fold lines "E", "F", "G", and "H" so that a flap 416 rests adjacent the exterior panel 402 and in a recess 418 defined by the interior bottom panel 400. Next, the double-ply, back panel 70 (see FIG. 45) is formed by first folding interior back panels 420a,b along fold lines "I" and "J" and then by folding an exterior back panel 422 along fold lines "K" and "L" so that a flap 424 rests adjacent the exterior bottom panel 402 and abutting the interior bottom panel 400. A tab 426 extending from the exterior bottom panel 402 is then inserted into a slot 428 defined by the exterior back panel 422 and flap 424 so that it resides in a cutout 430 formed by the interior back panels 420a,b.

Once the outer sleeve 42 is assembled, the columnar supports 72 (see FIG. 2) are inserted from within the cavity 44 so that they are adjacent to the interior right or left side panels 404,412 with mating portions 74 occupying the aperatures 78. The base plate 86 is then inserted into the cavity 44 so that it rests adjacent to the interior bottom panel 400. As the base plate 86 is inserted, the latching hooks 226 releasably couple the base plate 86 to the columnar supports 72. Note that the base plate 86 also rests against the interior back panels 420a,b and tab 426 which rests in cut-out 430.

Note that the patterns and assembly methods described above are for illustration purposes only and not for purposes of limiting the present invention. Other shapes, patterns and assembly methods may certainly be employed and are considered within the scope of this invention.

Figure 41:
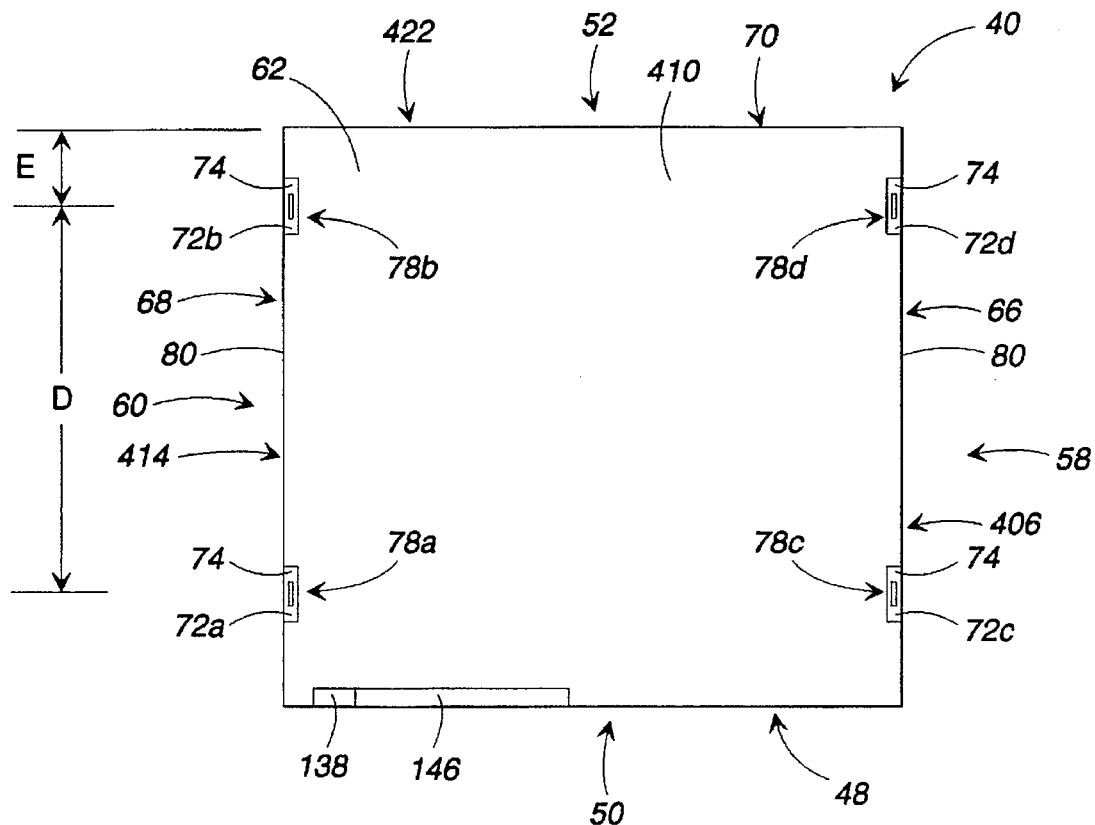
FIG. 41 is a top view of the multi-media storage container of FIG. 1.

The assembled outer sleeve 42 (with the face plate 48 in place) is shown in the various views of FIGS. 41–45 to point out particular features and relationships. The top view of FIG. 41 more clearly shows the exterior top panel 410 and the mating portions 74 of the columnar supports 76a,b,c,d occupying aperatures 78a,b,c,d, respectively, near the edges 80. Note that the top panel 62 defines only the small portion 82 of each aperature 78. Also, note that aperatures 78a,b, 78c,d are oriented with aperatures 78a,c nearest the front 50 and aperatures 78b,d nearest the back 52 of the multi-media storage container 40. Preferably, the distance, "D", between the aperatures 78a,b,78c,d and the distance, "E", between the aperatures 78b,d and the back 52 are identical on the right and left sides 58,60 of the multi-media storage container 40. FIG. 41 also shows the relative location of the lock cover plate 138 and the label cover 146 in the face plate 48.

Figure 42:
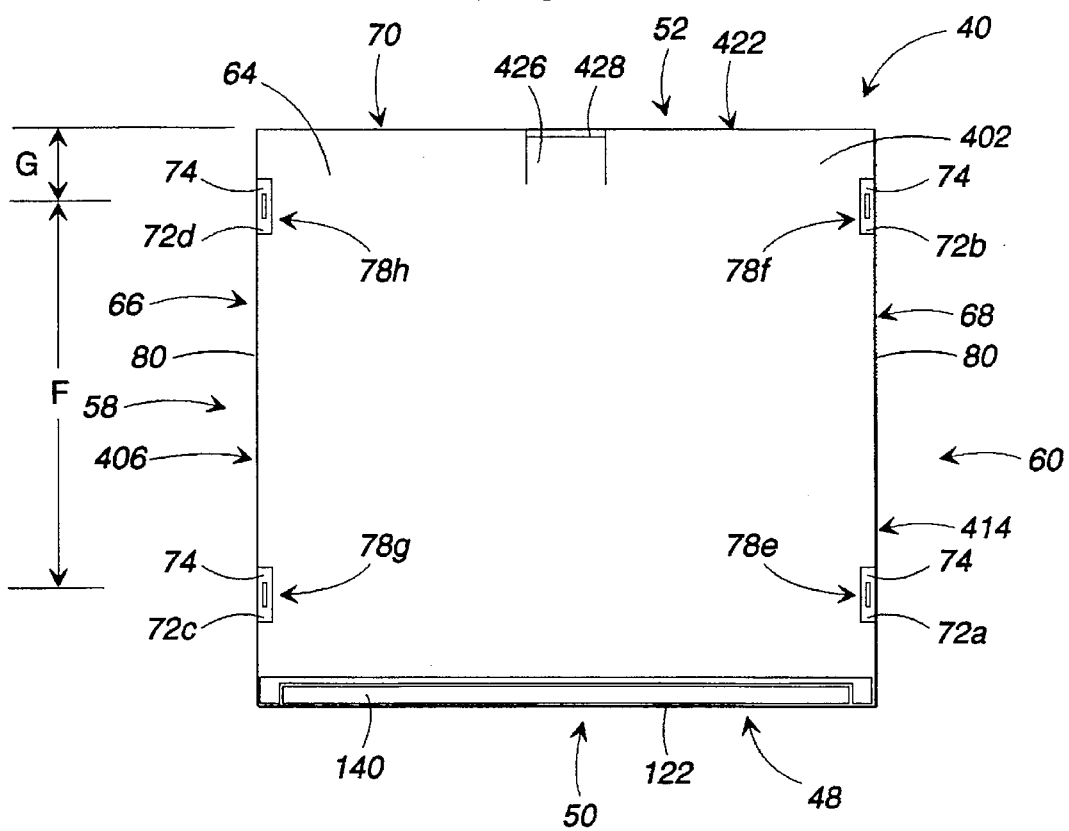
FIG. 42 is a bottom view of the multi-media storage container of FIG. 1.

FIG. 42 depicts a bottom view of the multi-media storage container 40 and displays the exterior bottom panel 402 with the mating portions 74 of the columnar supports 72a,b,c,d occupying aperatures 78e,f,g,h, respectively, near the edges 80. Similarly to the top panel 62, the bottom panel 64 defines only the small portion 82 of each aperature 78. Note also, like the top panel 62, aperatures 78e,f,78g,h are oriented with aperatures 78e,g nearest the front 50 and aperatures 78f,h nearest the back 52 of the multi-media storage container 40. Preferably, the distance, "F", between aperatures 78e,f,78g,h and the distance, "G", between aperatures 78f,h and the back 52 are identical on the right and left sides 58,60 of the multi-media storage container 40 and are identical to distances "D" and "E", respectively, shown in FIG. 41. The exterior bottom panel 402 also includes tab 426 that extends into slot 428 to aid in securing the panels 62,64,66,68,70 of the outer sleeve 42 together. As a bottom view of the multi-media storage container 40, FIG. 3 includes a bottom view of the face plate 48 clearly showing the front wall 122 and the finger pull recess 140.

Figure 43:
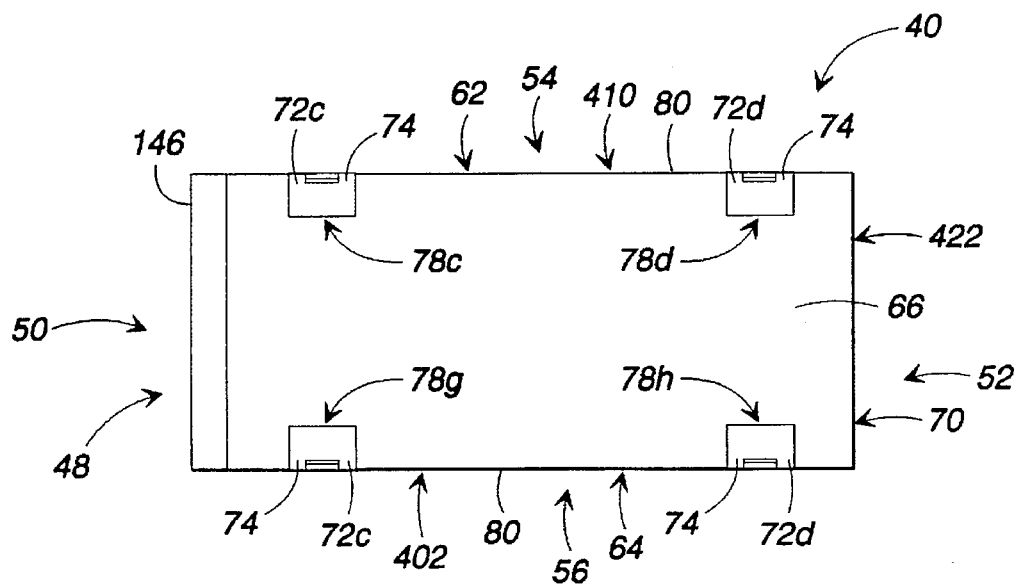
FIG. 43 is a right side, elevational view of the multi-media storage container of FIG. 1.

The right side 58 of the multi-media storage container 40 is illustrated by the right side elevational view of FIG. 43. Shown in the figure are the relative locations of the aperatures 78c,d,g,h and mating portions 74 of the columnar supports 76c,d along edges 80 of the exterior right side panel 406. Note that the right side panel 66 defines the large portion 84 of the aperatures 78. The right side view of FIG. 43 also shows the face plate 48 and the label cover 146 protruding slightly toward the front 50 and top 54 of the multi-media storage container 40. The left side 60 of the multi-media storage container 40 is, basically, a mirror-image of the right side 58.

Figure 44:
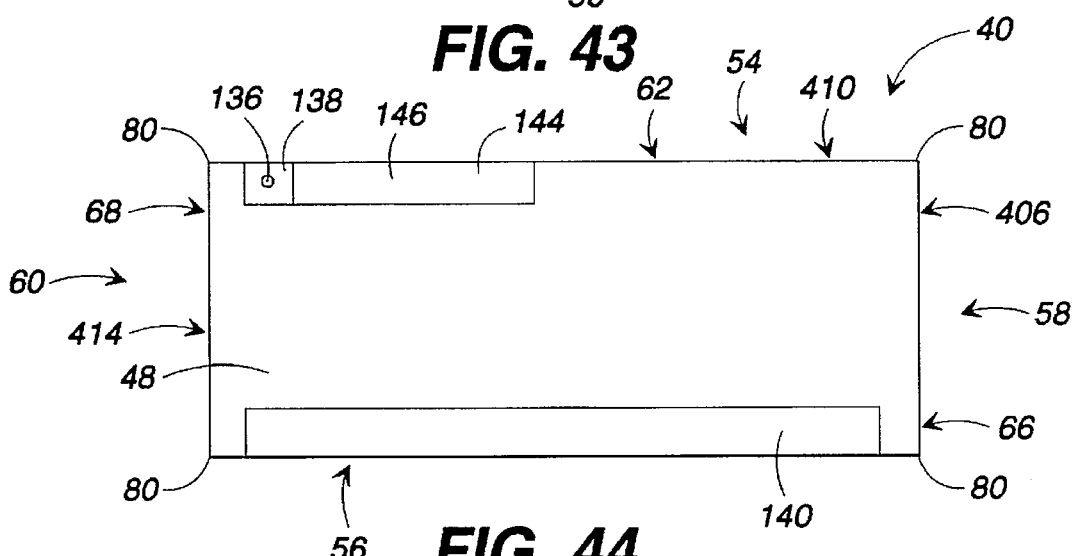
FIG. 44 is a front, elevational view of the multi-media storage container of FIG. 1.
Figure 45:
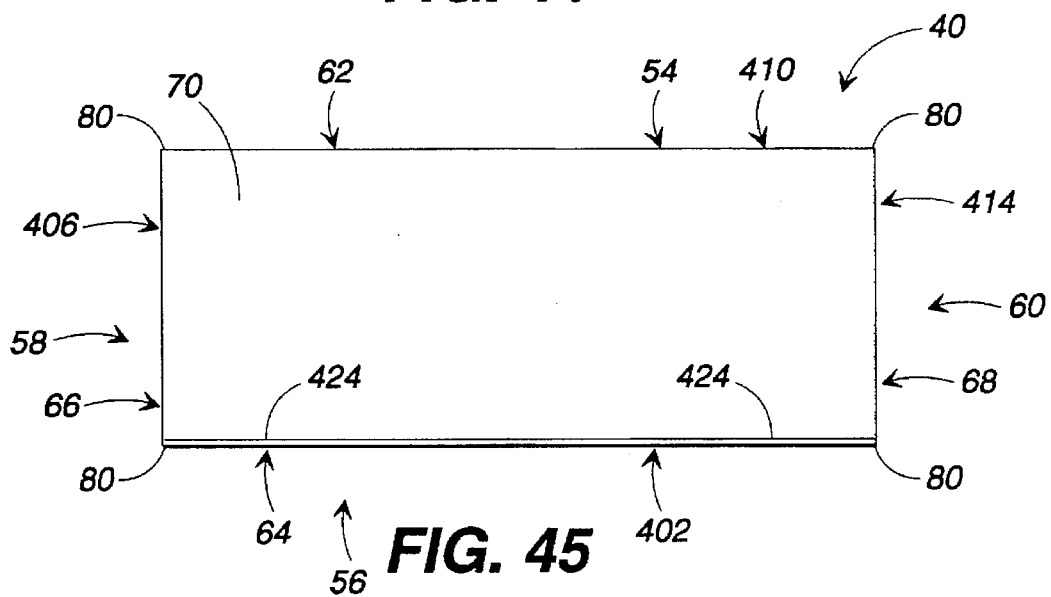
FIG. 45 is a back, elevational view of the multi-media storage container of FIG. 1.

The front 50 and back 52 of the multi-media storage container 40 are depicted more clearly in FIGS. 44 and 45, respectively. As previously described, the face plate 48 defines a finger pull recess 140 (see FIGS. 1 and 4) that may be used by a user to slide the insert 46 relative to the outer sleeve 42. The face plate 48 also includes a lock cover plate 138 and keyway 136 that is used to lock and unlock the multi-media storage container 40. The label recess 144 and the label cover 146 are located adjacent to the lock cover plate 138. FIG. 45 displays a back view of the multi-media storage container 40 and shows the flap 424 tucked inside the exterior bottom panel 402.

Figure 46:
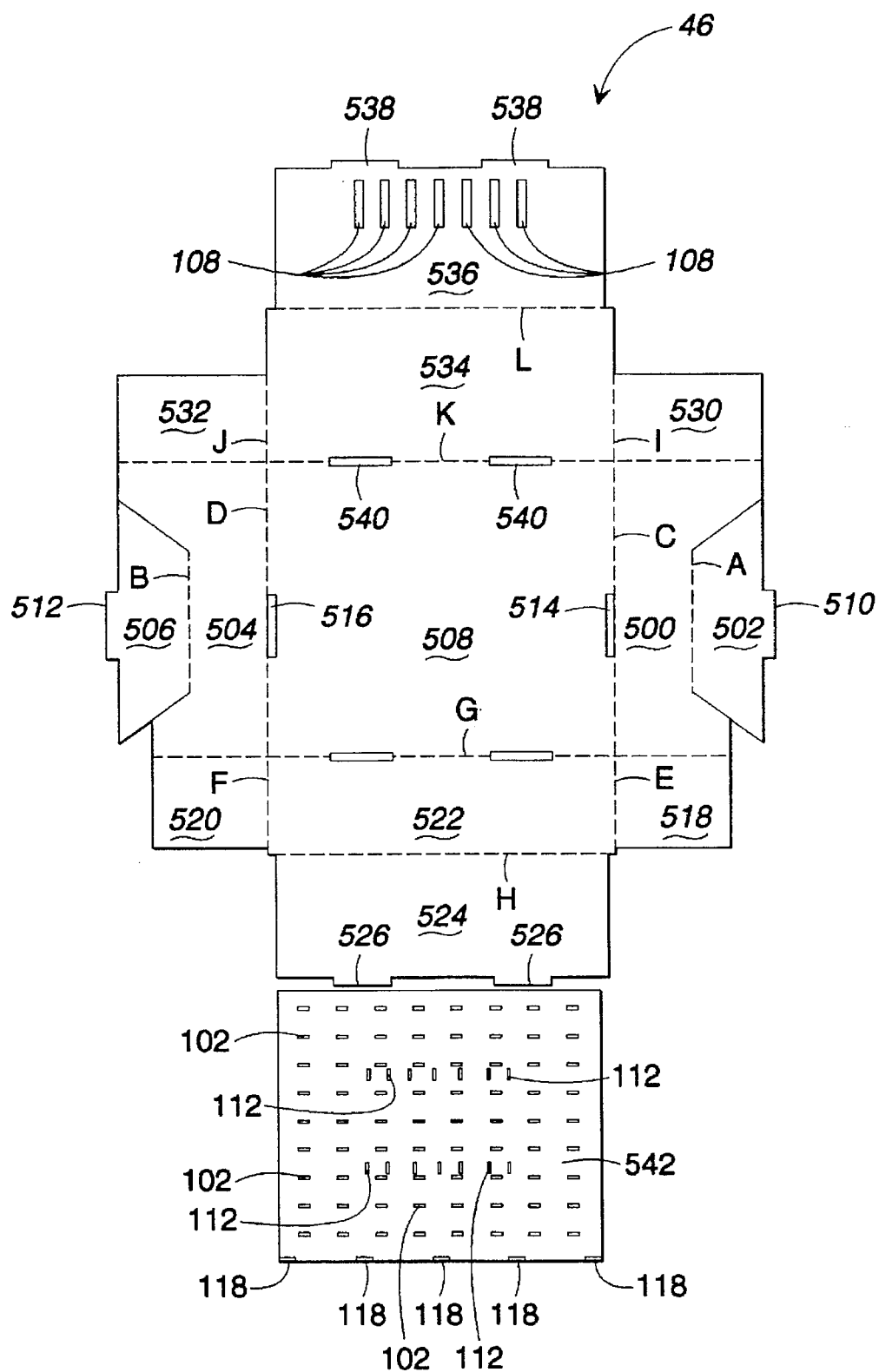
FIG. 46 is a cut and fold pattern for the insert of FIG. 3.

The insert 46 of the multi-media storage container 40 is manufactured, preferably, by punching the insert 46 from a single-ply sheet of corrugated cardboard on a punch press according to the pattern illustrated in FIG. 46. Note that in FIG. 46, solid lines indicate cuts that are made, while dashed lines indicate folds that are made. Once, the insert 46 is punched, the uniquely shaped (and, for the most part, double-ply) right and left side panels 94,96 are formed by: folding an interior right side panel 500 so that it rests adjacent to an exterior right side panel 502 using fold line "A"; folding an interior left side panel 504 so that it rests adjacent to an exterior left side panel 506 using fold line "B"; folding the exterior right and left side panels 502,506 relative to an exterior bottom panel 508 along fold lines "C","D"; and, inserting tabs 510,512, extending from the interior right or left side panels 500,504, into slots 514,516 defined by the exterior right or left side panels 502,506 and the exterior bottom panel 508. Then, the double-ply (and, in certain areas, triple-ply) front panel 90 is formed by: folding flaps 518,520 along fold lines "E","F"; folding an exterior front panel 522 relative to the exterior bottom panel 508 so that it rests adjacent to flaps 518,520 using fold line "G"; folding an interior front panel 524 so that it rests adjacent to the exterior front panel 522 and the flaps 518,520 using fold line "H"; and, inserting tabs 526, extending from the interior front panel 524, into slots 528 defined by the exterior bottom panel 508 and the exterior front panel 522. Next, the double-ply (and, in certain areas, triple-ply) back panel 92 is formed by: folding flaps 530,532 along fold lines "I","J"; folding an exterior back panel 534 relative to the exterior bottom panel 508 so that it rests adjacent to flaps 530,532 using fold line "K"; folding an interior back panel 536 so that it rests adjacent to the exterior back panel 534 and the flaps 530,532 using fold line "L"; and, inserting tabs 538, extending from the interior back panel 536, into slots 540 defined by the exterior bottom panel 508 and the exterior back panel 534. Finally, an interior bottom panel 542 is positioned so that it rests adjacent to the exterior bottom panel 508 and abuts the interior panels 500,504,524,536.

Once the insert 46 is assembled, the face plate 48 is slid over the front panel 90 (see FIG. 4) so that the front panel 90 resides within the internal chamber 126 defined by the front wall 122, internal ribs 244, and the interfacing portion 124. As the face plate 48 is positioned, the alignment fingers 120 are inserted into the notches 118 defined by the interior bottom panel 542. The insert stop 198 is then installed, if desired, into the uppermost depression 134 of columnar support 76c (see FIG. 17). Finally, the insert 46 is slid into the cavity 44 of the outer sleeve 42 until the face plate 48 abuts the outer sleeve 42. Later, if desired, media dividers 106 and media supports 116 may be installed within the reservoir 100.

Note that the patterns and assembly methods described above are for illustration purposes only and not for purposes of limiting the present invention. Other shapes, patterns and assembly methods may certainly be employed and are considered within the scope of this invention.

Figure 47:
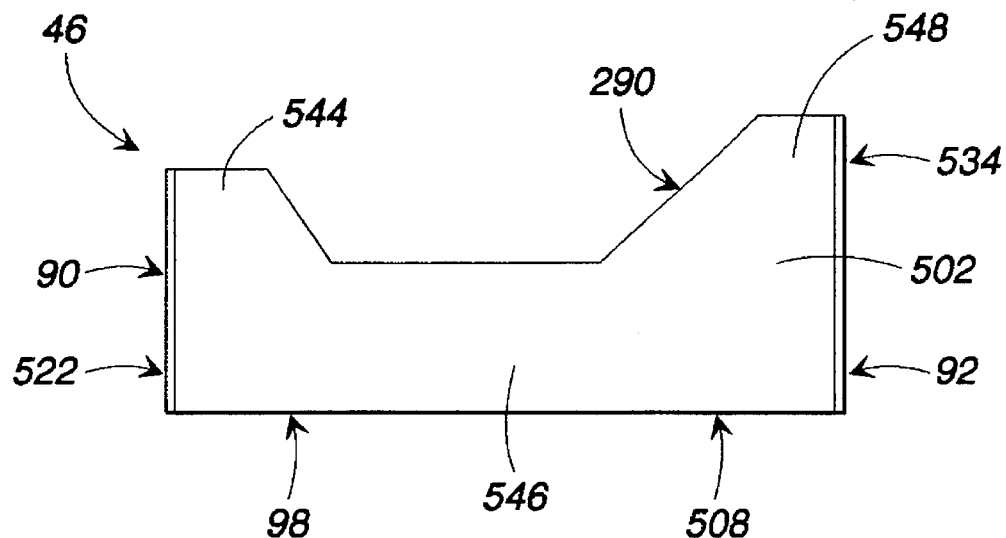
FIG. 47 is a right side, elevational view of the insert of FIG. 3.

The assembled insert 46 (without the face plate 48), in accordance with the preferred embodiment of the present invention, is shown in the various views of FIGS. 47–50 to point out particular features and relationships. The right side elevational view of FIG. 47 shows the exterior right side panel 502 of the insert 46 including a front portion 544 that tapers into a midsection 546. FIG. 47 also shows a back portion 548 that tapers along tapered edge 290 into the midsection 546 as well. The midsection 546 is narrower than the front and back portions 544,548 of the exterior right side panel 502 to enable a user to more easily grasp the insert 46 if it is necessary to remove it from the outer sleeve 42. The exterior front and back panels 522,534 are also seen in FIG. 47, while the interior front and back panels 524,536 are not seen because they are folded into the reservoir 100 of the insert 46. Note that the left side elevational view of the insert 46 is, essentially, a mirror-image of the right side elevational view and is, therefore, not shown in the figures. Also, note that different shaped side panels 94,96 are within the scope of the present invention.

Figure 48:
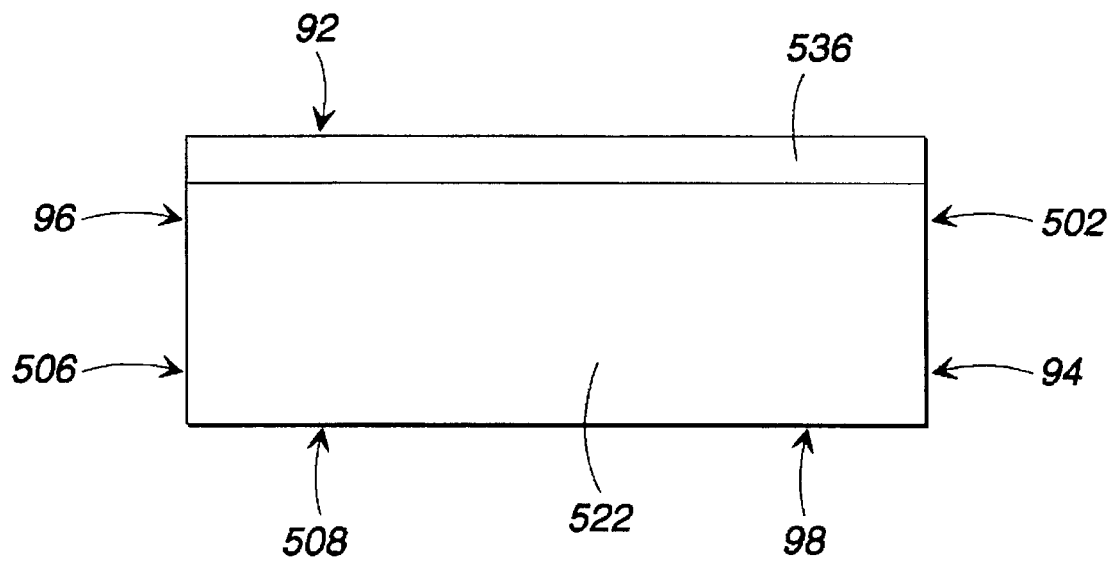
FIG. 48 is a front, elevational view of the insert of FIG. 3.

As illustrated in the front elevational view of FIG. 48, the front panel 90 of the insert 44 is lower than the back panel 92 to enable the front panel 90 to fit within the internal chamber 126 of the face plate 48, while allowing the face plate 48 and the outer sleeve 42 to abut properly. More specifically, in FIG. 48, the interior back panel 536 of back panel 92 is visible above the exterior front panel 522 of front panel 90.

Figure 49:
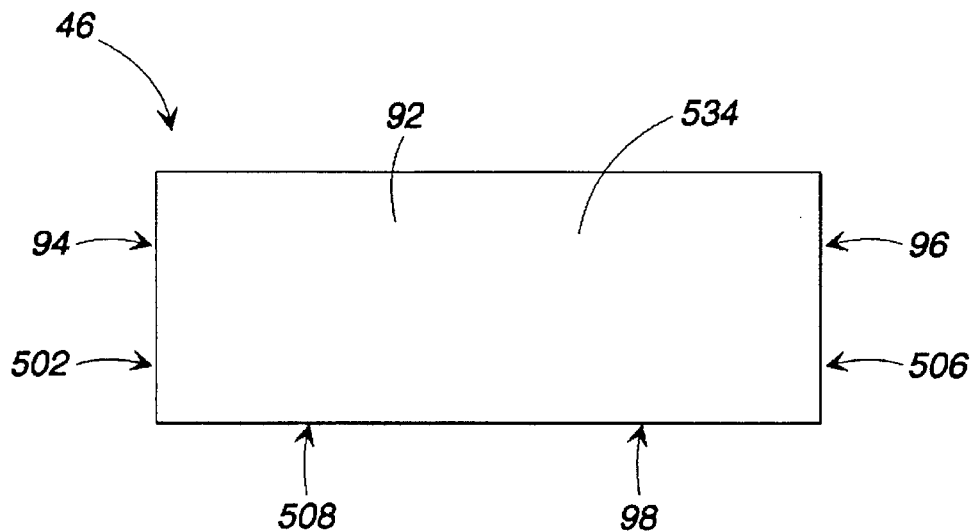
FIG. 49 is a back, elevational view of the insert of FIG. 3.
Figure 50:
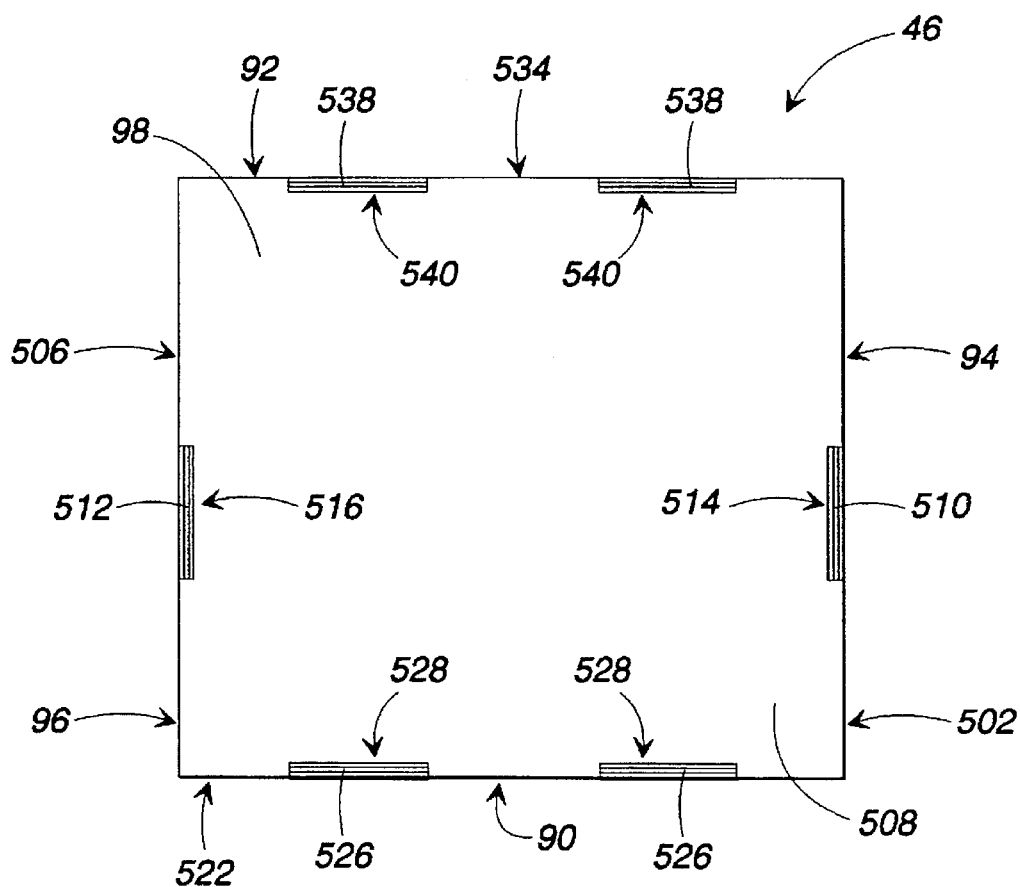
FIG. 50 is a bottom view of the insert of FIG. 3.

The exterior back panel 534 of back panel 92 and the exterior bottom panel 508 of bottom panel 98 are seen in FIGS. 49 and 50, respectively. Note that the exterior bottom panel 508 defines the slots 514,516,528,540 that receive tabs 510,512,526,538 from the right, left, front, and back interior panels 500,504,524,536.

Whereas this invention has been described in detail with particular reference its most preferred embodiments, it will be understood that variations and modifications can be effected within the spirit and scope of the invention, as described herein before and as defined in the appended claims.

I claim:

1. A multi-media storage container, comprising:

an outer sleeve having an external surface and defining a cavity, said outer sleeve, further defining an aperture extending through said outer sleeve between said external surface and said cavity;

an insert removably insertable into said cavity of said outer sleeve and defining a reservoir; and a columnar support removably interacting with said outer sleeve proximate to said aperture, said columnar support having a surface occluding said aperture and flush with said external surface of said outer sleeve;

whereby data media are protectively stored by placing media within the reservoir of the insert and inserting the insert into the cavity of the outer sleeve.

2. The apparatus of claim 1 wherein, said aperture is a first aperture, said outer sleeve further defines a second aperture adjacent said first aperture, said second aperture is larger than said first aperture and extends from said cavity partially through said outer sleeve, and said outer sleeve includes, at least, a surface extending around said first aperture, said surface facing said cavity and being contactable through said second aperture.

3. The apparatus of claim 2 wherein, said surface of said columnar support is a first surface and said columnar support includes, at least, a second surface, and said second surface of said columnar support abuts said surface of said outer sleeve.

4. The apparatus of claim 3, wherein said second surface of said columnar support extends around said first surface of said columnar support.

5. The apparatus of claim 3 wherein, said first and second surfaces of said columnar support define a shoulder extending around said first surface between said first and second surfaces, said first aperture has an edge, and said shoulder abuts said edge of said first aperture.

6. The apparatus of claim 2 wherein, said outer sleeve further includes, at least, a first panel and a second panel adjoining said first panel, said first and second panel defining an edge therebetween, said first and second apertures extend through and about said edge, said first and second apertures extending at least partially through said first panel, said second panel, and said edge.

7. The apparatus of claim 6 wherein, each of said first and second panels of said outer sleeve has an external surface, said external surfaces of said first and second panels defining a portion of said external surface of said outer sleeve, said surface of said columnar support includes, at least, a first portion and a second portion, said first portion of said surface of said columnar support is flush with said external surface of said first panel, and said second portion of said surface of said columnar support is flush with said external surface of said second panel.

8. The apparatus of claim 7, wherein said surface of said columnar support includes, at least, a third portion, said third portion being arcuate and flush with said edge.

9. The apparatus of claim 6, wherein said surface of said columnar support defines a receptacle for receipt of a clip, whereby a first outer sleeve and a second outer sleeve are releasably joined upon receipt of a clip by a receptacle of the first outer sleeve and a receptacle of the second outer sleeve.

10. The apparatus of claim 9 wherein, said surface of said columnar support defines an edge collinear with said edge defined by said first and second panels, and said edge of said surface partially defines said receptacle.

11. The apparatus of claim 3 wherein, said first surface and said second surface of said columnar support partially define a mating portion of said columnar support, said columnar support has a first end and a second end disposed vertically from said first end, said mating portion is a first mating portion located at said first end of said columnar support, and said columnar support includes, at least, a second mating portion located at said second end of said columnar support.

12. The apparatus of claim 11 wherein, said apparatus further includes, at least, a third aperture and a fourth aperture vertically opposing said respective first and second apertures, said third and fourth apertures receive said second mating portion of said columnar support.

13. The apparatus of claim 1 wherein, said outer sleeve includes, at least, a bottom panel, said apparatus further includes, at least, a base plate residing within said cavity atop said bottom panel, said base plate covering a substantial portion of said bottom panel, and said base plate is releasably coupled to said columnar support.

14. The apparatus of claim 13, wherein said columnar support extends partially beneath said base plate.

15. The apparatus of claim 13 wherein, said base plate defines a latching member, said columnar support defines an opening, and said latching member of said base plate cooperates with said opening of said columnar support, whereby the columnar support is releasably latched to the base plate.

16. The apparatus of claim 1 wherein, said apparatus further includes, at least, a locking mechanism having a keeper, said columnar support defines a depression, and said keeper of said locking mechanism cooperates with said depression of said columnar support, whereby the locking mechanism interfaces with the columnar support, whereby the insert is releasably locked to the outer sleeve.

17. The apparatus of claim 1 wherein, said apparatus further includes, at least, a face plate removably coupled to said insert, said face plate forming a front of said outer sleeve and defining an internal chamber, said insert includes, at least, a front panel partially defining said reservoir, a portion of said front panel being received by said internal chamber, and a bottom panel abutting said front panel, said bottom panel defining a notch proximate to said front panel, and said face plate includes, at least, an interfacing portion depending into said reservoir and cooperating with said notch, whereby the face plate is removably secured to the insert.

18. The apparatus of claim 1 wherein, said outer sleeve includes, at least, a first panel and a second panel adjoining said first panel, and said surface of said columnar support interacts with said first panel and said second panel.

19. The apparatus of claim 18 wherein, said first panel and said second panel define an edge therebetween, said surface of said columnar support defines an edge, and said edge of said surface is collinear with said edge defined by said first and second panels.

20. The apparatus of claim 19, wherein said edge of said surface of said columnar support defines a receptacle therein.

21. The apparatus of claim 18 wherein, said first panel defines a first portion of said aperture, and said second panel defines a second portion of said aperture.

22. The apparatus of claim 18, wherein said surface of said columnar support has a first portion coplanar with said first panel.

23. The apparatus of claim 18 wherein, said first panel defines a first portion of said aperture, a first portion of said surface of said columnar support interacts with said first portion of said aperture.

24. The apparatus of claim 18 wherein, said outer sleeve further includes, at least, a third panel adjoining said second panel, said surface of said columnar support is a first surface, and said columnar support has a second surface interacting with said second and third panels.

25. The apparatus of claim 1 wherein, said surface of said columnar support is a first surface and said columnar support has a second surface, said outer sleeve has a surface at least partially bounding said aperture, and said second surface of said columnar support interacts with said surface of said outer sleeve.

26. The apparatus of claim 1 wherein, said surface of said columnar support is a first surface and said columnar support: has a second surface, said first and second surfaces of said columnar support define a shoulder extending between said first and second surfaces, said aperture has an edge, and said shoulder abuts said edge of said aperture.

27. A multi-media storage container for storing and protecting data media, comprising:

an outer sleeve defining a cavity, said outer sleeve including, at least, a support interaction portion including a rim defining an aperture through said outer sleeve;

an insert removably insertable into said cavity of said outer sleeve and defining a reservoir, said insert including, at least, a front panel and an opposing back panel partially defining said reservoir, said back panel further defining a slot;

a face plate residing over said front panel and extending into said reservoir, said face plate defining a slot; and a media divider connected to said insert and residing within said reservoir removably positioned between said front panel and said back panel, said media divider including, at least, a first end having a tab removably residing within said slot of said face plate, and a second end opposite said first end and having a tab removably residing within said slot of said back panel;

whereby the reservoir is portionable to enable storage of different types and sizes of computer data media, and whereby data media are protectively stored by placing media within the reservoir of the insert and inserting the insert into the cavity of the outer sleeve.

28. A multi-media storage container for storing and protecting data media, comprising:

an outer sleeve defining a cavity, said outer sleeve including, at least, a first support interaction portion and a second support interaction portion opposed to said first support interaction portion, each said support interaction portion including, at least, a rim defining an aperture through said outer sleeve;

an insert removably insertable into said cavity of said outer sleeve and defining a reservoir;

a columnar support residing within said cavity adjacent said outer sleeve and removably extending into each said aperture, said columnar support extending between said first and second support interaction portions of said outer sleeve;

wherein said columnar support includes, at least, a first mating portion interfacing with said aperture of said first support interaction portion and a second mating portion interfacing with said aperture of said second support interaction portion;

wherein each said aperture of said first and second support interaction portions, includes, at least, an interior aperture, and an exterior aperture adjacent said interior aperture, said interior aperture and said exterior aperture defining an aperture face;

wherein each said mating portion of said columnar support includes, at least, an interior mating portion at least partially residing within said respective interior aperture, and an exterior mating portion at least partially residing within said respective exterior aperture; and wherein each said interior and exterior mating portions defines a mating face that abuts said respective aperture face, whereby structural loads are at least partially transferred from the outer sleeve to the columnar support;

whereby data media are protectively stored by placing media within the reservoir of the insert and inserting the insert into the cavity of the outer sleeve.

29. A multi-media storage container for storing and protecting data media, comprising:

an outer sleeve defining a cavity, said outer sleeve including, at least, a support interaction portion including a rim defining an aperture through said outer sleeve;

an insert removably insertable into said cavity of said outer sleeve and defining a reservoir;

a columnar support removably extending into said aperture and interacting with said support interaction portion of said outer sleeve, said columnar support residing within said cavity and adjacent said outer sleeve;

a base plate residing within said cavity of said outer sleeve and detachably secured to said columnar support, said base plate including, at least, a latching hook rising from said base plate into said cavity and facing said columnar support; and wherein said columnar support includes, at least, a latch receiving opening proximate to said base plate which receives said latching hook, whereby data media are protectively stored by placing media within the reservoir of the insert and inserting the insert into the cavity of the outer sleeve.

30. The apparatus of claim 29, wherein said base plate includes, at least, a raised center section, whereby the insert is, at least, partially supported.

31. The apparatus of claim 29, wherein said base plate includes, at least, a partially grooved top surface, whereby side to side sliding of the insert is limited.

32. A multi-media storage container for storing and protecting data media, comprising:

an outer sleeve defining a cavity, said outer sleeve including, at least, a first panel and a second panel adjoining said first panel, said first and second panels defining an edge therebetween, a support interaction portion including a rim defining an aperture through said outer sleeve, said support interaction portion intersecting said edge; an insert removably insertable into said cavity of said outer sleeve and defining a reservoir; a face plate removably coupled to said insert, wherein said face plate defines a chamber and extends over and adjacent to said front panel; said insert including at least a front panel partially defining said reservoir and being received by said chamber, and at least a bottom panel abutting said front panel; said face plate including, at least, an interfacing portion partially defining said chamber and residing adjacent said front panel and within said reservoir, and an alignment finger depending from said interfacing portion within said reservoir; said bottom panel defining a notch proximate to said front panel for receiving said alignment finger; and a columnar support removably extending into said aperture and interacting with said support interaction portion of said outer sleeve; whereby data media are protectively stored by placing media within the reservoir of the insert and inserting the insert into the cavity of the outer sleeve, and the face plate is removably secured to the insert and a user slides the insert relative to the outer sleeve by applying pressure on the face plate.

33. The apparatus of claim 32, wherein said columnar support resides within said cavity and adjacent said outer sleeve.

34. The apparatus of claim 33 wherein, said columnar support extends through said aperature and defines an interconnection receptacle that receives a clip portion, said outer sleeve is a first outer sleeve and said apparatus further includes, at least, a second outer sleeve adjacent said first outer sleeve, said columnar support is a first columnar support and said apparatus further includes, at least, a second columnar support within said second outer sleeve, and said apparatus further includes, at least, a clip having a first portion connected to said interconnection receptacle of said first columnar support and a second portion connected to said interconnection receptacle of said second columnar support, whereby said first columnar support of said first outer sleeve is interconnected to said second columnar support of said second outer sleeve, and whereby said first outer sleeve is interconnected to said second outer sleeve to form an array of multi-media storage containers.

35. The apparatus of claim 33 wherein, said support interaction portion is a first support interaction portion, and said apparatus further includes, at least, a second support interaction portion opposed to said first support interaction portion, said second support interaction portion including a rim defining an aperature through said outer sleeve.

36. The apparatus of claim 35, wherein said columnar support extends between and interacts with said first and second support interaction portions.

37. The apparatus of claim 36, wherein each said aperature of said first and second support interaction portions includes, at least, an interior aperature, and an exterior aperature adjacent said interior aperature, said interior aperature and said exterior aperature defining an aperature face.

38. The apparatus of claim 37 wherein, said columnar support further includes, at least, a mating portion interfacing with each said aperature of said first and second support interaction portions, said mating portion includes, at least, an interior mating portion, at least, partially residing within each said interior aperature, and an exterior mating portion, at least, partially residing within each said exterior aperature, and said interior and exterior mating portions define a mating face that abuts each said aperature face, whereby structural loads are, at least, partially transferred from said outer sleeve to said columnar support.

39. The apparatus of claim 32 wherein, said face plate has a bottom and defines a recess extending upward within said face plate from said bottom, and said face plate further defines an opening to said recess, whereby a user's fingers are received by the recess through the opening to enable the user to remove the insert from the outer sleeve.

40. The apparatus of claim 32 wherein, said support interaction portion includes, at least, a first portion and a second portion, said first panel defines said first portion of said support interaction portion, and said second panel defines said second portion of said support interaction portion.

41. The apparatus of claim 32, wherein said outer sleeve further includes, at least, an external surface extending around said outer sleeve and defining a vertical extent of said columnar support.

42. A multi-media storage container for storing and protecting data media, comprising:

an outer sleeve defining a cavity, said outer sleeve including, at least, a first panel and a second panel adjoining said first panel, said first panel and said second panel defining an edge therebetween, a support interaction portion including a rim defining an aperture through said outer sleeve, said support interaction portion intersecting said edge; an insert removably insertable into said cavity of said outer sleeve and defining a reservoir; a columnar support removably extending into said aperture and interacting with said support interaction portion of said outer sleeve, said columnar support residing within said cavity and being adjacent said outer sleeve; and a base plate residing within said cavity of said outer sleeve, said base plate being detachably secured to said columnar support; wherein said outer sleeve includes a bottom panel, said base plate residing atop said bottom panel and substantially covering said bottom panel; whereby data media are protectively stored by placing media within the reservoir of the insert and inserting the insert into the cavity of the outer sleeve.

43. The apparatus of claim 42 wherein, said base plate includes, at least, a latching hook rising from said base plate into said cavity and facing said columnar support, and said columnar support includes, at least, a latch receiving opening proximate to said base plate that receives said latching hook, wherein said base plate is detachably latched to said columnar support.

44. The apparatus of claim 43, wherein said base plate includes, at least, a raised center section, whereby said insert is, at least, partially supported.

45. The apparatus of claim 44, wherein said base plate further includes, at least, a partially grooved top surface, whereby side to side sliding of the insert is limited.

46. A multi-media storage container for storing and protecting data media, comprising:

an outer sleeve defining a cavity, said outer sleeve including, at least, a first panel and a second panel adjoining said first panel, said first and second panels defining an edge therebetween, a support interaction portion including a rim defining an aperture through said outer sleeve, said support interaction portion intersecting said edge; wherein said aperture extends through and about said edge of said outer sleeve; an insert removably insertable into said cavity of said outer sleeve and defining a reservoir; and a columnar support removably extending into said aperture and interacting with said support interaction portion of said outer sleeve; whereby data media are protectively stored by placing media within the reservoir of the insert and inserting the insert into the cavity of the outer sleeve.

* * * * *